Aug. 29, 1933.  W. H. ROBERTSON  1,924,290
CASH REGISTER
Filed March 4, 1927    10 Sheets-Sheet 2

Inventor
William H. Robertson
By Carl Beust
Henry E. Stauffer
His Attorneys

Aug. 29, 1933.   W. H. ROBERTSON   1,924,290
CASH REGISTER
Filed March 4, 1927   10 Sheets-Sheet 3
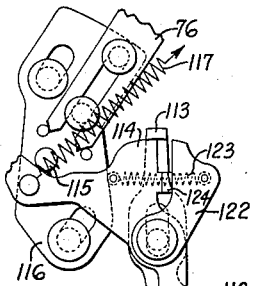
FIG. 4
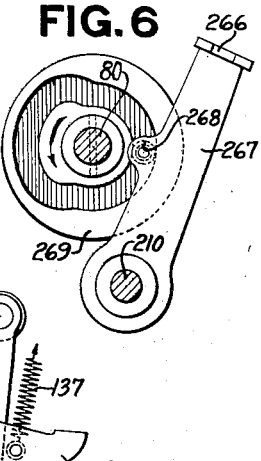
FIG. 6
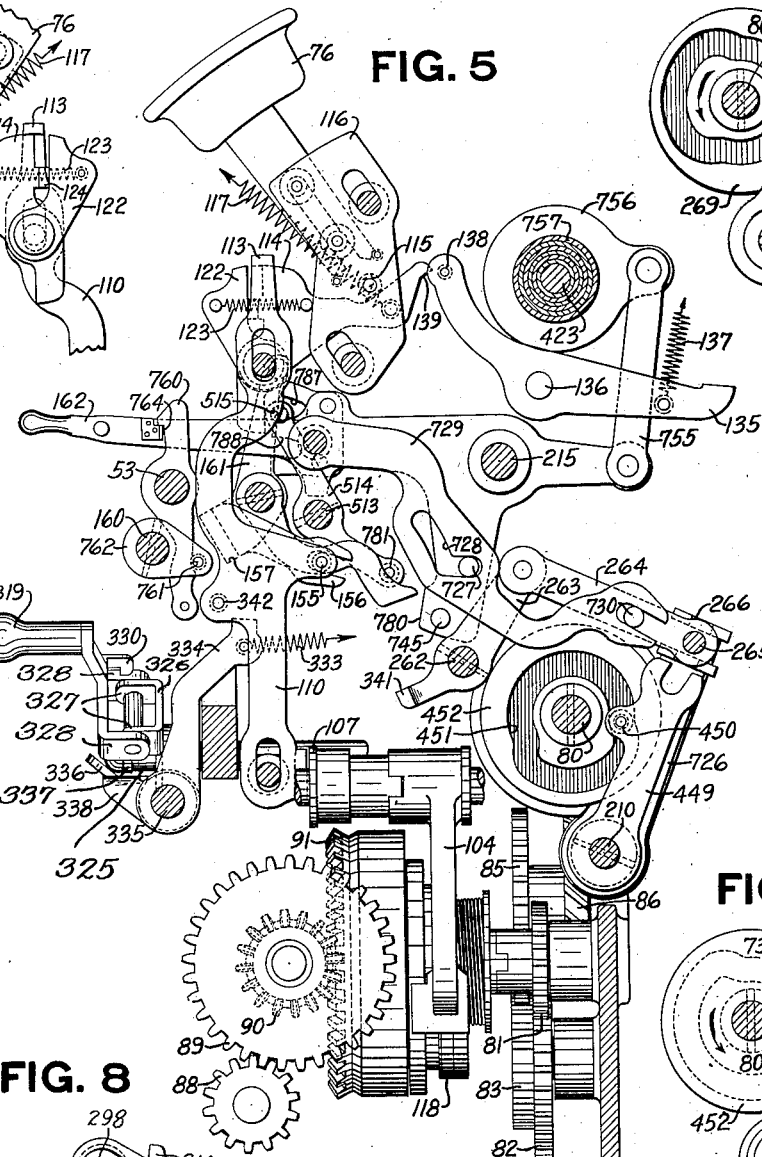
FIG. 5
FIG. 7
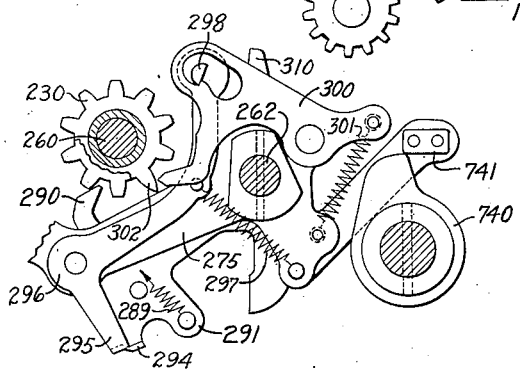
FIG. 8
Inventor
William H. Robertson
By Earl Beust
Henry E. Stauffer
His Attorneys Aug. 29, 1933.    W. H. ROBERTSON    1,924,290
CASH REGISTER
Filed March 4, 1927    10 Sheets-Sheet 4
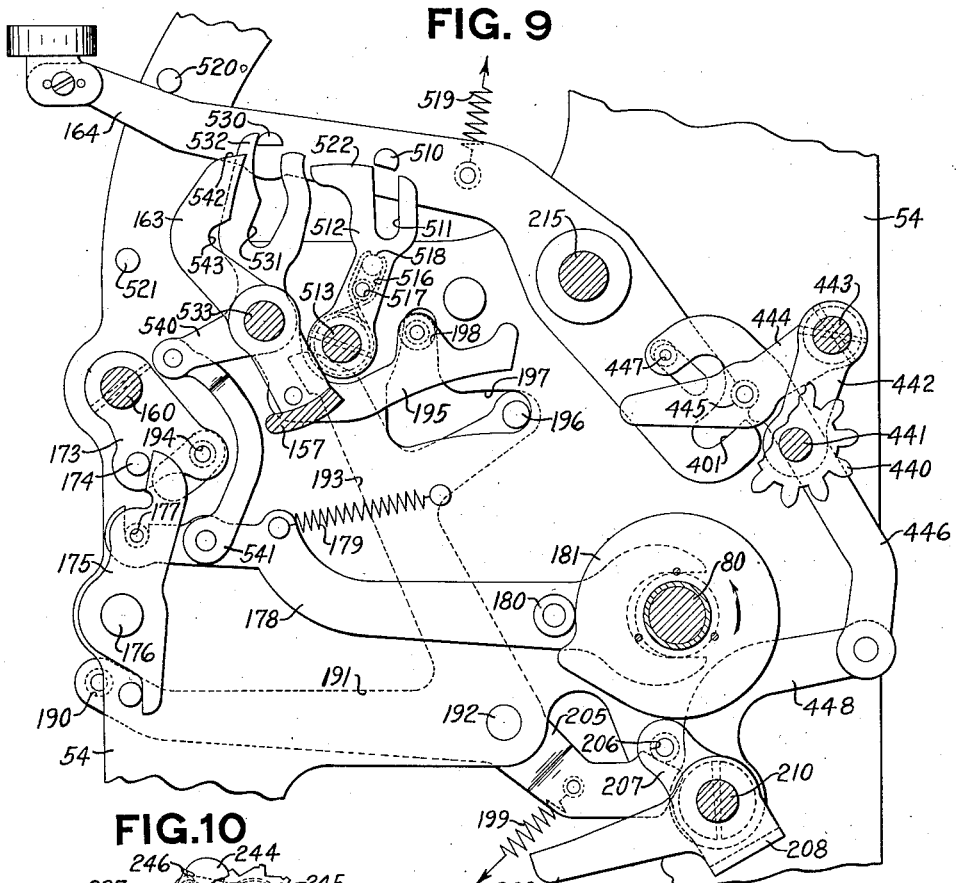
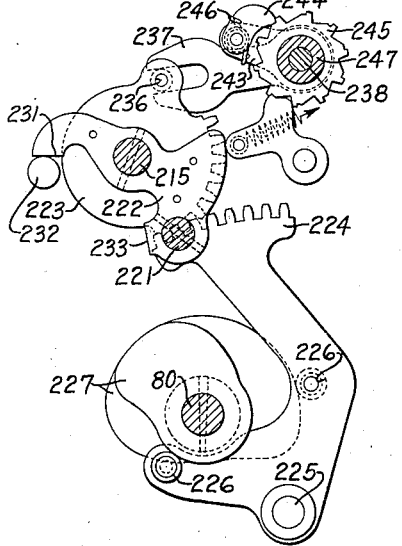
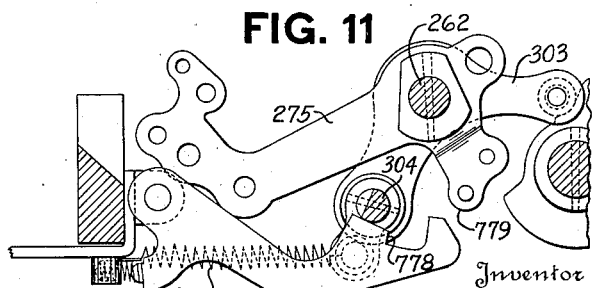
Inventor
William H. Robertson Aug. 29, 1933.　　　W. H. ROBERTSON　　　1,924,290
CASH REGISTER
Filed March 4, 1927　　　10 Sheets-Sheet 5

Inventor
William H. Robertson
By Earl Beust
Henry E. Stauffer
His Attorneys

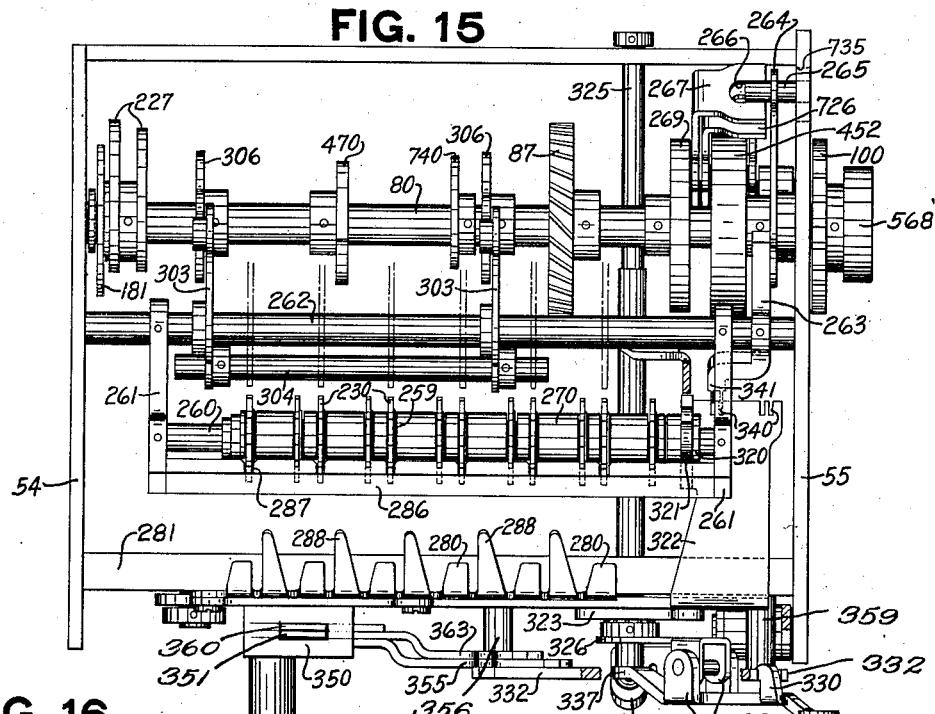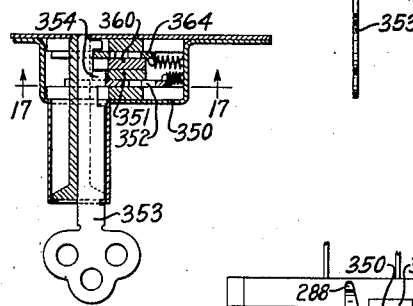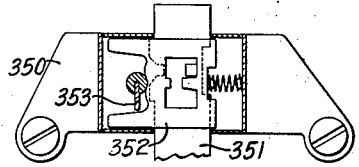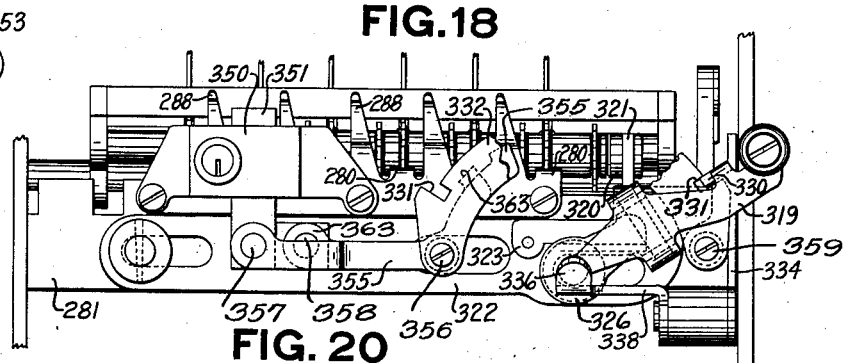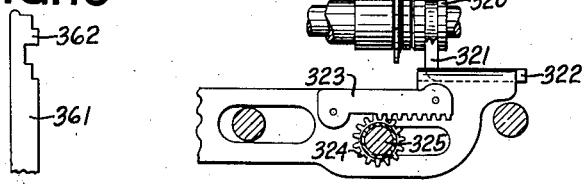

Aug. 29, 1933.  W. H. ROBERTSON  1,924,290
CASH REGISTER
Filed March 4, 1927  10 Sheets-Sheet 7

Inventor
William H. Robertson
By
His Attorneys

Aug. 29, 1933.  W. H. ROBERTSON  1,924,290
CASH REGISTER
Filed March 4, 1927  10 Sheets-Sheet 8

Inventor
William H. Robertson
By Pearl Beust
Henry E. Stauffer
His Attorneys

Aug. 29, 1933.   W. H. ROBERTSON   1,924,290
CASH REGISTER
Filed March 4, 1927   10 Sheets-Sheet 9

Inventor
William H. Robertson
By Carl Beust
Henry E. Stauffer
His Attorneys

Aug. 29, 1933.   W. H. ROBERTSON   1,924,290
CASH REGISTER
Filed March 4, 1927    10 Sheets-Sheet 10

Inventor
William H. Robertson
By Carl Beust
Henry E Stauffer
His Attorneys

Patented Aug. 29, 1933

1,924,290

UNITED STATES PATENT OFFICE 1,924,290

CASH REGISTER

William H. Robertson, Dayton, Ohio, assignor to The National Cash Register Company, Dayton, Ohio, a Corporation of Maryland Application March 4, 1927. Serial No. 172,660

22 Claims. (Cl. 235—2)

This invention relates to improvements in cash registers, and more particularly to the type shown and described in United States Letters Patent No. 1,816,263, issued July 28, 1931.

One object of this invention is to provide an improved cash register for use in telegraph offices and the like.

Another object is to provide a machine with a plurality of totalizers and an independent detail record for each totalizer.

Another object is to provide a machine with connections which select the proper record upon selection of a totalizer, and which prevents amounts being entered on the totalizers, unless the amounts are also recorded on their respective records.

Another object is to provide a consecutive numbering mechanism which is rendered operative when a totalizer is selected, thereby counting the number of transactions added into the selected totalizer.

Another object is to provide a plurality of printing hammers, one of which is selected when a totalizer is selected.

Another object is to provide a plurality of totalizers and a plurality of record material receptacles equal in number to the number of totalizers in the machine, and a device for permitting insertion of record material into the receptacle corresponding to the totalizer selected.

Another object is to provide a totalizer selecting lever which is locked in its varied positions by a lock having two bolts, each operated independently of the other and by a separate key.

Another object is to provide a means for transferring a total from one totalizer to another, said transfer being effected after the totalizer from which the total is to be transferred has been turned to zero.

With these and incidental objects in view, the invention consists of certain novel features of construction and combinations of parts, the essential elements of which are set forth in appended claims and a preferred form or embodiment of which is hereinafter described with reference to the drawings which accompany and form part of this specification.

Of said drawings:

Fig. 4 is a detail view of a part of the machine releasing mechanism.

Fig. 5 is a detail view showing the total control lever and its associated mechanism, together with the motor bar and the mechanism for releasing the machine.

Fig. 6 is a detail view of the cam for engaging and disengaging the totalizer with the actuators during adding operations.

Fig. 7 is a detail view of the cam for engaging and disengaging the totalizer with the actuators during "read" operations.

Fig. 8 is a detail view of the transfer mechanism.

Fig. 9 is a detail view of the repeat release key, together with its interlocks and associated mechanisms.

Fig. 10 is a detail view of the customer counter and the totalizer differential operating mechanism.

Fig. 11 is a detail view of the means for controlling the transfer mechanism, to prevent its operation during "non-add" operations.

Fig. 15 is a top plan view of the totalizer shifting mechanism, together with the main cam shaft.

Fig. 16 is a cross-sectional view through the totalizer selecting lever lock.

Fig. 17 is a detail view taken on line 17—17 of Fig. 16.

Fig. 18 is a front elevation of the totalizer selecting mechanism.

Fig. 19 is a detail view of a part of another key for operating the lock shown in Fig. 16.

Fig. 20 is a detail view of a part of the totalizer selecting mechanism.

*General description*

Figure 1:
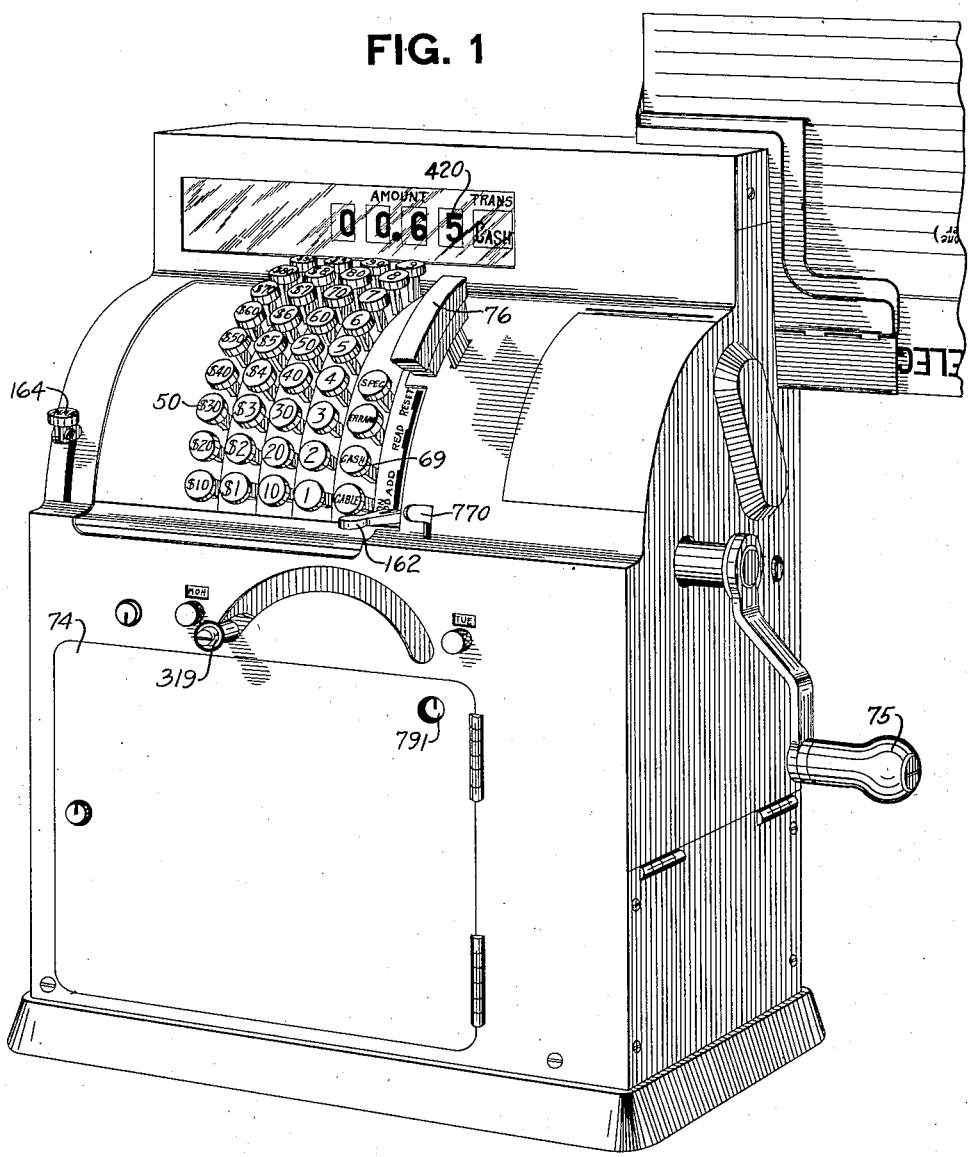
Fig. 1 is a perspective view of the machine shown enclosed within its cabinet.

The machine described herein is adapted for use in telegraph offices and the like. However, it is to be understood that this machine is not limited to this line of business, as it can be used in many other businesses. A system used by one telegraph office has been adopted by way of illustration, so that the invention may be better understood.

When a customer presents a message for transmission, the clerk at the desk verifies the number of words in the message and informs the customer of the amount of charge. The telegram blank is then inserted into the proper receptacle, which has been automatically selected, and the amount keys designating the cost of sending the telegram are depressed. The machine as illustrated is provided with four banks of amount keys and one transaction bank having four special keys. If necessary, the proper special key is also depressed. However, in the case of an ordinary telegram, the depression of a special key is unnecessary. After all of the keys have been depressed, the clerk depresses the motor bar and the machine is operated, either by an electric motor or by hand as desired. The amount paid is indicated at the top of the machine to assure the customer that such amount has been entered into the machine. The amount, the clerk's initial and the character of the transaction, are printed on the telegram blank, together with a consecutive number. This number identifies the telegram and it is known thereby. Each clerk is provided with a totalizer, each of which is selected by a lever at the front of the machine. A separate detail strip is provided for each totalizer, and thus the amounts entered into a given totalizer are recorded on a detail strip set aside for that totalizer, and nothing else can be recorded thereon.

The repeat release key is provided for use when more than one message of the same length and destination are entered in succession. Thus, after recording the first message, any number of duplicates can be entered by simply depressing the repeat release key. However, for each operation a telegram blank is inserted in the proper receptacle. This repeat release key speeds up the entry of the telegrams, because the amount keys and motor bar need not be depressed for repeat operations. The consecutive number for each operation is different, and thus even though the rest of the record is a duplicate of the original, the consecutive numbering changes at each operation.

The machine, as shown, is provided with two receptacles and two type lines, one of each for each totalizer. When one totalizer is used it is necessary to print from one type line, and when the other is used it is necessary to print from the other type line. This is necessary, because a separate consecutive numbering device is provided for each totalizer. In order to eliminate any possibility of printing from the wrong type line, thereby printing the wrong consecutive number, a device has been provided for closing the receptacle not to be used. This device is operated by the totalizer selecting mechanism. Two forms of this device are shown herein, and each makes it impossible to insert the blank in the wrong receptacle.

Sometimes a customer sends a "batch" of telegrams, that is, a number of telegrams, all of which are alike but are to be sent to different addresses and the charge for each is the same. In order to save the customer's time, the clerk enters the amount of the whole batch at one time. Later on when time is available to the clerk, the total control lever at the right of the machine is moved to its "non-add" position. Then a blank is inserted in the machine for each telegram and the amount and consecutive number are printed thereon. But during these operations the amounts are not entered into the totalizer, this operation being performed only for the purpose of certifying and identifying each telegram.

It is not necessary to insert a blank for each operation when entering the individual telegrams of a "batch", and therefore, if desired the registration may be made for each telegram and a blank inserted only for the last registration. Thus, the consecutive number for the last telegram is printed on the blank and a pencil notation can be placed on this telegram for the whole "batch", for example, Nos. 13865 and 13890.

Theoretically, the day's business closes as midnight. However, night letters dated one day are received up until 2 A. M. of the next day. It is desirable to keep each day's business separate. At midnight there is only one clerk on duty, and therefore, during this period the two totalizers can be utilized, one for each day's business. As illustrated, the left-hand position of the totalizer selecting lever is marked "Mon.", and the right-hand position is marked "Tues.", thus the "Mon." totalizer is used until 2 A. M. Tuesday morning for all night letters dated Monday. The "Tues." totalizer is used for all other business received after midnight. The indicators for the totalizer selecting lever positions can be changed each day, a knob being provided for this purpose.

Totals and sub-totals can be printed only by authorized persons, inasmuch as the total control lever is under lock and key.

DETAILED DESCRIPTION

Amount banks

Figure 3:
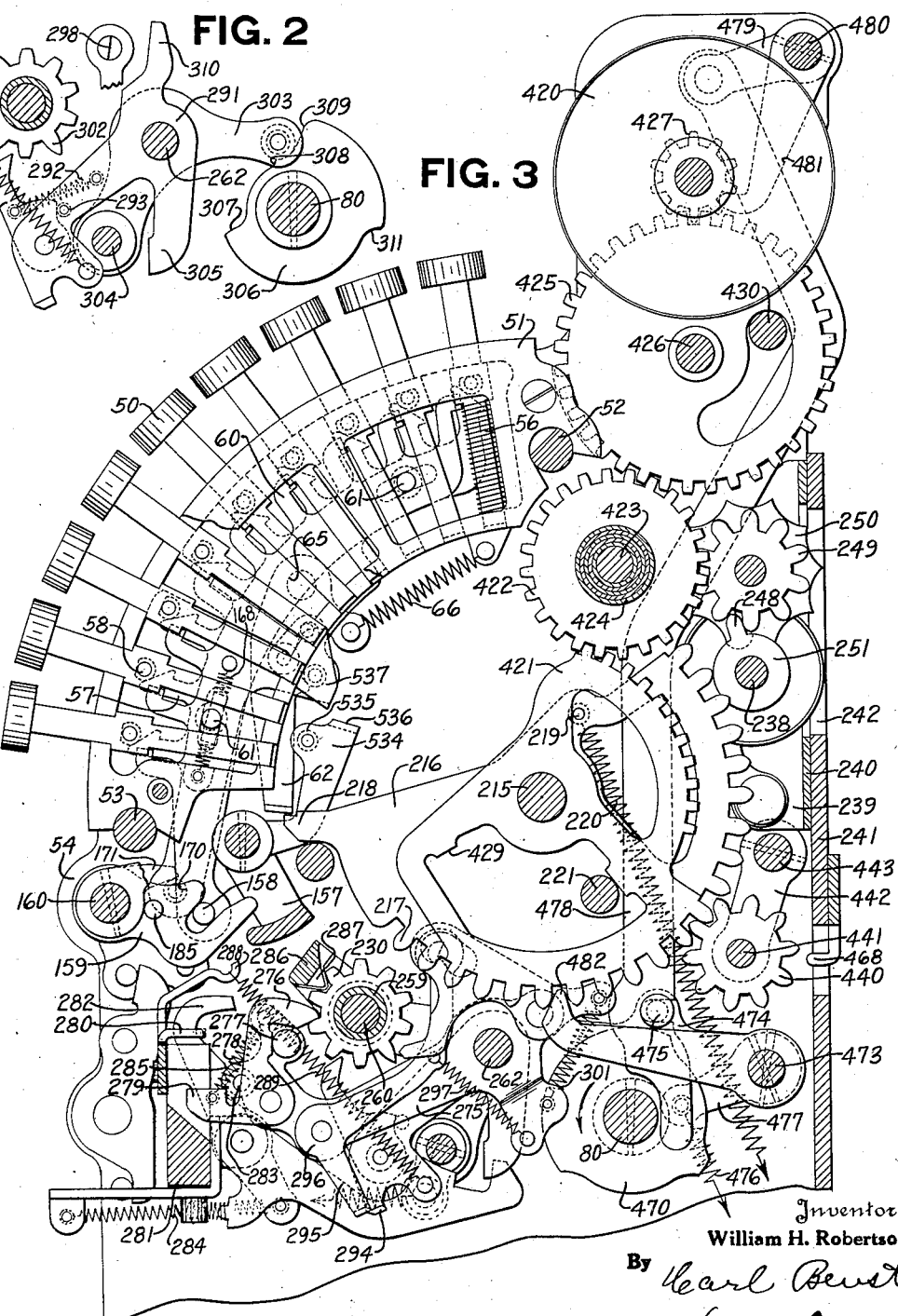
Fig. 3 is a vertical cross-sectional view showing one of the amount banks and its associated mechanism.
Figure 12:
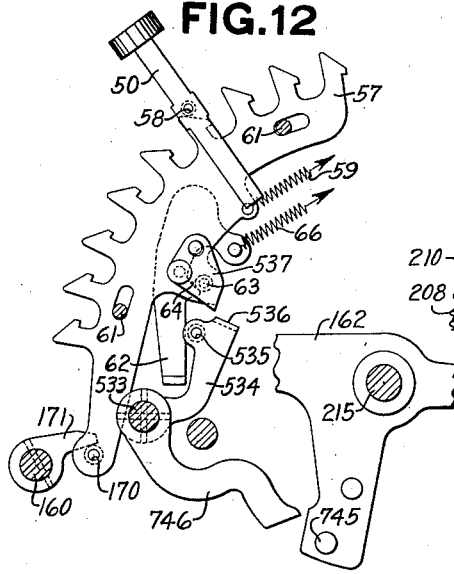
Fig. 12 is a detail view of the interlock between the total control lever and the amount banks of keys.

The machine is provided with four banks of amount keys 50 (Figs. 1 and 3) slidably mounted in key frames 51, supported on rods 52 and 53. The rods 52 and 53 are carried in the side frames 54 and 55 (Figs. 3, 9 and 15). Each key 50 is held in its outer or normal position by a coil spring 56, (only one of which is shown in Fig. 3) which surrounds the shank of the key in the usual and well known manner. Each bank is provided with a flexible detent 57 (see also Fig. 12), with which a stud 58, secured to each key 50, cooperates. The depression of a key shifts the detent 57 downwardly against the tension of a spring 59 (Fig. 12) until the stud passes the shoulder on the detent 57, whereupon the spring 59 shifts the detent upwardly, thereby holding the key in its depressed position.

Each bank is also provided with a locking bar 60 (Fig. 3), which upon release of the machine is moved upwardly by mechanism to be hereinafter described, thereby moving the locking bar 60 beneath the studs 58 of the undepressed keys and over the stud 58 of the depressed key, thus locking the undepressed keys in their outer positions and the depressed key in its inner position. The flexible detent 57 and the locking bar 60 are slidably mounted on two studs 61, (Figs. 3 and 12) secured to the key frame 51.

Each bank of amount keys is provided with a zero stop pawl 62 (Figs. 3 and 12) for controlling the differential mechanism to be later described, when no key is depressed in the bank. The pawl 62 is rocked to its ineffective position by a stud 63, carried by the detent 57, when any key is depressed in the associated amount bank. Depression of a key lowers the detent 57, as above described, thereby rocking the zero stop pawl 62 in a clockwise direction by engagement of the stud 63 with the shoulder 64 on the zero stop pawl 62. The zero stop pawl is pivoted on a stud 65 (Fig. 3) on the key frame 51, and held in engagement with the stud 63 at all times by a spring 66 stretched between a stud on the pawl and a stud on the key frame 51, as shown in Fig. 3.

Transaction bank

The transaction bank of keys 69 (Fig. 1), is of the same construction as the amount banks. These keys are used for printing identification characters and indicating the kind of transactions entered in the machine.

Operating mechanism

After the operator has depressed the desired keys representing the transaction, he may operate the machine either by means of a crank 75 (Fig. 1) or by an electric motor. The motor is located beneath the registering mechanism and access thereto may be had through a door 74 (Fig. 1) in the front of the cabinet. Depression of the motor bar 76 releases the clutch mechanism and closes a circuit through the motor. Such a mechanism is shown and described in United States Letters Patent to Kettering and Chryst, No. 1,144,418, dated June 29, 1915. Release of the motor causes a main cam shaft 80 (Figs. 5 and 13), to receive one complete rotation which will operate the machine. Rotation of the cam shaft 80 is effected by a train of mechanism, including pinion 81, pinions 82 and 83, secured together and mounted on a stud 84, and pinion 85 secured to a worm gear 86, which meshes with a worm gear 87 on the main cam shaft 80. Pinion 81 is secured by a sleeve to one member of the motor clutch mechanism above referred to. The motor clutch is driven by means of a pinion 88 (Fig. 5) on the motor armature, which meshes with a gear 89 secured to a bevel pinion 90. The bevel pinion 90 meshes with a bevel gear 91 secured to one member of the motor clutch mechanism. When the motor is released the clutch drives the pinion 81, and through the train of pinions and gears 83, 82, 85, 86 and 87 causes the main cam shaft 80 to receive one complete rotation.

Figure 27:
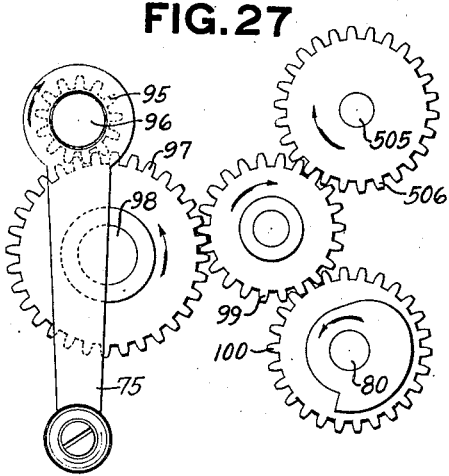
Fig. 27 is a detail view of the means for driving the cam shafts of the machine through the manually operated handle.

When the machine is operated by the crank 75 (Fig. 27), the main cam shaft 80 is given one complete rotation by means of the following train of gears. The crank 75 is clutched to a pinion 95 mounted on a stud 96 carried by the right side frame 55. The pinion 95 meshes with a gear 97, loosely mounted on a stud 98. The gear 97 meshes with an idle gear 99, which engages a gear 100 on the main cam shaft 80. The ratio of the gears in this train of gears is such that in order to give the cam shaft 80 one complete rotation, it is necessary to give the crank 75 two complete rotations for each operation of the machine.

Machine releasing mechanism

Figure 13:
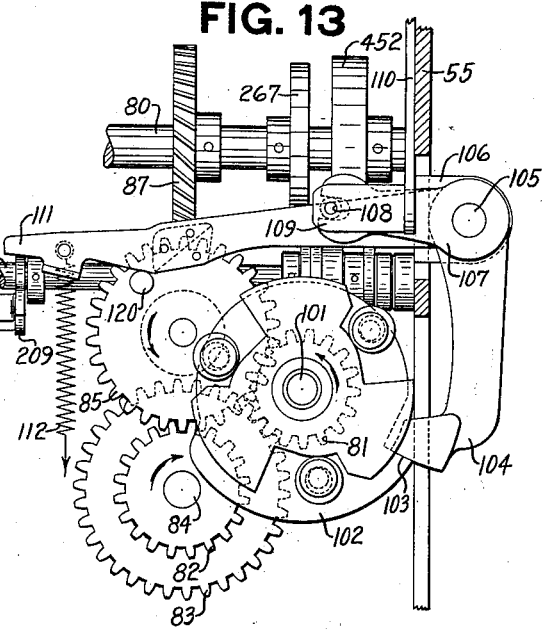
Fig. 13 is a detail view of the driving connection between the motor and the machine, together with the tripping means.

The machine is released for operation by depression of the motor bar 76 (Fig. 5). The above mentioned pinion 81 (Fig. 13) is loose on a stud 101, upon which is also mounted, to rotate, a disk 102 clutched to the pinion 81. The disk 102 has a shoulder 103, normally engaged by an arm 104 loose on a stud 105 mounted in a bracket 106, carried by the right side frame 55. The hub of the arm 104 is clutched to bifurcated arm 107 (see also Fig. 5) which engages a stud 108 mounted on a flange 109 on a link 110. Secured to the hub of the arm 104 is an arm 111, to which is attached a spring 112, which constantly tends to rotate the arm 111 in counter-clockwise direction (Fig. 13). The spring 112, by means of the arm 111 and arm 107, normally tends to lower the link 110, but is prevented from doing so by a pawl 114 (Figs. 4 and 5), contacting a flange 113 formed on the upper end of the link 110. The pawl 114 is held in contact with a stud 115 mounted on a slidably mounted plate 116 by a spring 117. The motor bar 76 is removably mounted on two studs carried by the plate 116, and the spring 117 normally maintains the motor bar 76 in its outer or normal position.

Depression of the motor bar 76, through the plate 116 and stud 115, rotates the pawl 114 in a clockwise direction (Fig. 5), thereby withdrawing the pawl 114 from beneath the flange 113, and permitting the spring 112 (Fig. 13) to lower the link 110. This movement of the link 110 rocks the arm 104 counter-clockwise (Fig. 13) to withdraw the arm 104 from the path of the shoulder 103 on the disk 102. This withdrawal of the arm 104 releases the clutch mechanism, thereby permitting the machine to begin an operation.

This release of the disk 102 permits the operation of the spring-driven cam 118 (Fig. 5), for closing a circuit through the motor and for permitting the motor to operate. The mechanism for closing the circuit through the motor is well known in the art, and is illustrated and described in the above mentioned Kettering and Chryst patent.

The link 110 is restored to its normal position near the end of the operation of the machine by a stud 120 (Fig. 13), secured to the gear 85. The stud 120, at the proper time, engages a block on the arm 111, and the arm 107 and its connection with the link 110 lifts the link high enough to permit the pawl 114 (Figs. 4 and 5), to be rocked under the flange 113.

This movement of the arm 111 also rocks the arm 104 into the path of the shoulder 103, thereby stopping the machine.

The well known non-repeat pawl 122 (Figs. 4 and 5) is provided for preventing a second operation of the machine in case the motor bar 76 is not permitted to return to its normal position before the end of the operation of the machine. If the operator should hold the motor bar in its depressed position as the machine completes its operation, the non-repeat pawl moves beneath the flange 113 by a spring 123, which normally holds the pawl 122 engaged with a flange 124 on the release pawl 114. The operation of this non-repeat pawl is well known in the art and no further description thereof will be given herein.

Motor bar lock

A key lock is provided, which is not shown herein, but which is identical with the lock for the motor bar shown and described in the above mentioned co-pending application. The turning of the key in this lock permits an arm 135 (Fig. 5), pivoted on a stud 136, to be rocked in a counter-clockwise direction under the influence of a spring 137. This counter-clockwise movement of the arm 135 moves a stud 138 thereon into the path of a shoulder 139 on the pawl 114. Thus it is seen that when the stud 138 is in the path of the pawl 114, it is impossible to depress the motor bar, and therefore, the machine cannot be released for operation.

Locking bar operating means

As above mentioned, each bank of keys is provided with a locking bar 60 (Fig. 3), which is rocked beneath the studs 58 of the undepressed keys and above the stud 58 of the depressed key, thereby preventing depression of a key, or the release of the depressed key, after the machine has been released.

Figure 14:
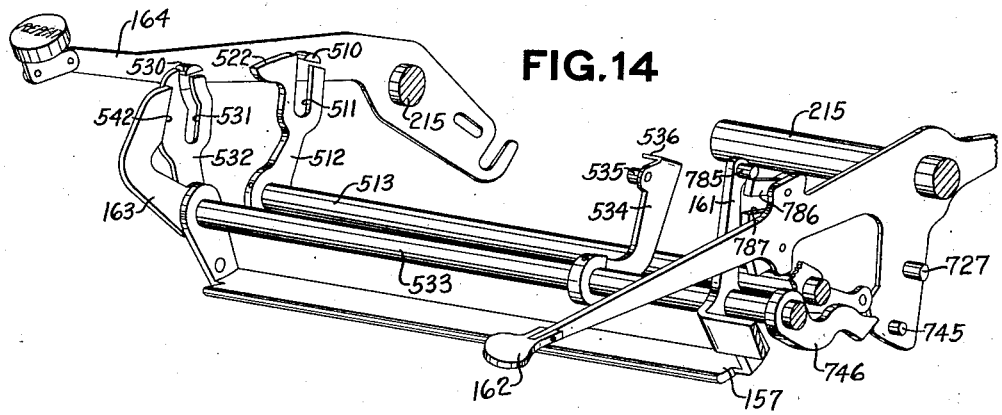
Fig. 14 is a perspective view of the interlocks between the repeat release key and the various other mechanisms of the machine.

Mechanism for operating this locking bar is under control of the link 110 (Fig. 5). The link 110 has secured thereto a stud 155, embraced by a bifurcated arm 156 of a yoke 157 (see also Fig. 14), extending between the side frames 54 and 55. Each locking bar 60 is provided with a stud 158, (Fig. 3) which projects into a bifurcated arm 159 loosely mounted on a shaft 160, carried by the side frames. The downward movement of the link 110, upon releasing the machine as above described, rocks the yoke 157 in a clockwise direction, to wipe against the lower ends of the arms 159 and move all of the arms 159 counter-clockwise, and by means of the studs 158, raises all the locking bars 60 into their locking positions.

The yoke 157 (Fig. 14) is provided with an arm 161 for preventing operation of a total lever 162, to be hereinafter described, and also with an arm 163, (Figs. 9 and 14) for preventing operation of a repeat release key 164 after the machine has been released. The repeat release key will also be hereinafter described. The total lever and repeat release key are mounted on a rod 215 supported in the side frames 54 and 55.

Near the end of the operation of a machine, when the link 110 is restored to its home position, as before described, the yoke 157 will return to its normal position, thereby permitting the locking bars 60 and arms 159 to return to their normal positions due to a spring 168 (Fig. 3). However, if for some reason, the parts should not be restored by the springs 168 to their normal or home positions, the key release mechanism to be presently described, will positively restore the locking bars and the arms 159 to their home or normal positions.

Key release mechanism

Mechanism has been provided for releasing the amount and the transaction keys at the end of the operation of the machine. Each flexible detent 57, in the amount and transaction banks, is provided with a stud 170 (Figs. 3 and 12) which normally is held in contact with an arm 171 by the spring 59. Upon depression of a key 50 its stud 58 is engaged by the hook on the detent 57. In order to permit the key to release, it is necessary to lower the detent 57. The arms 171 are secured to the shaft 160. Also secured to the shaft 160 (Fig. 9) is an arm 173 upon which is mounted a stud 174, held in contact with an arm 175, loosely mounted on a stud 176, carried by the left side frame 54. The arm 175 is provided with a stud 177 engaged by a notch in a pitman 178, and held in engagement therewith by a spring 179. The pitman 178 is provided with a roller 180, which cooperates with a cam 181 secured to the main cam shaft 80. The cam 181 is so timed that, near the end of the operation of the machine, it moves the pitman 178 to the left (Fig. 9), thereby rocking the arm 175 and the arm 173 for rocking the shaft 160 slightly in clockwise direction. This movement of the shaft 160 rocks the arms 171 (Fig. 12) to press against the studs 170, thereby lowering the flexible detents 57 far enough to permit the springs 56 (Fig. 3) surrounding the keys, to return the keys to their normal or outer positions.

The arms 171 are wide enough to engage not only the studs 170 but also studs 185 (Fig. 3), on the arms 159, for restoring the locking bars to their normal positions if they, for any reason, should happen to stick and, therefore, do not return home by the springs 168.

Manual key releasing mechanism

It is sometimes desirable to manually release all of the depressed keys at one time. In order to permit this release, a manually operable lever 191 (Fig. 9) has a knob 190 projecting through the cabinet of the machine. This lever is pivoted on a stud 192 and has an upwardly extending arm 193, which lies in the plane of a stud 194 on the arm 173. The downward movement of the lever 191 causes the arm 193 to press against the stud 194, thereby rocking the arm 173 and shaft 160 in a clockwise direction. This movement of the shaft 160 rocks the arms 171 to lower the flexible detents 57, thereby releasing all of the depressed keys.

An interlock is provided between the manual key releasing mechanism and the machine releasing mechanism, so that the machine cannot be released when the manually operable lever 191 is out of its normal position. As above mentioned, when the machine is released for operation, the yoke 157 (Fig. 9) is rocked in a clockwise direction. Secured to the left hand end of the yoke 157 is a rearwardly projecting arm 195, in the plane of a stud 196, secured to the lever 191. When the lever 191 is moved out of its home position, the stud 196 is moved into the path of the arm 195, thereby preventing movement of the arm 195 and the yoke 157, and in this manner preventing release of the machine for operation. The stud 196 projects through a slot 197 cut in the left side frame 54, due to the fact that the lever 191 is to the left of the frame 54, and the arm 195 is to the right of said frame. When the lever 191 is in its home position, the arm 195 can pass the stud 196 and, therefore, the machine can be released for operation.

The arm 195 is provided with a headed stud 198 (Fig. 9), which projects through the upwardly extending portion of the slot 197, the head of the stud acting as a guide for the arm 195, for holding it in positive alignment with the stud 196. A spring 199, secured to the lever 191, and a stud in the left side frame 54 normally maintain the lever 191 in its home or normal position.

After the machine has been released, the lever 191 cannot be operated, because at this time the end of the arm 195 lies in the path of the stud 196, thereby preventing movement of the lever 191.

If the motor bar is depressed with the lever 191 partly moved, or with an amount key partly depressed, the arm 195 and yoke 157 are given a slight movement in a releasing direction. A means is provided for restoring the motor bar and its associated mechanism, when the lever 191 is rocked to release the keys as above mentioned, if it has been partially released. The lever 191 is provided with a rearwardly projecting arm 205, which normally contacts a stud 206, secured to an arm 207. The arm 207 is connected to an arm 209 (Figs. 9 and 13), by means of a bar 208. Operation of the lever 191 raises the arm 209 to rock the arm 111 (Fig. 13), thereby restoring the arm 111. The arms 207 and 209 are loosely pivoted on a shaft 210 mounted in the side frames 54 and 55 of the machine.

*Differential mechanism*

The differential mechanisms for all the banks are identical, and therefore, only one of these differentials will be described herein. This differential is of the spring actuated type; that is, the type in which the actuator is adjusted under the influence of a spring, the differential movement thereof being controlled by the depressed key.

Pivoted on the rod 215 (Fig. 3) is an actuator 216 provided with teeth 217 and a forwardly extending arm 218. The actuator 216 has secured thereto a stud 219, to which one end of a spring 220 is connected, the other end of which is connected to a rod (not shown) carried by the side frames 54 and 55. The spring 220 normally tends to rock the actuator 216 in a clockwise direction, but is prevented from doing so by a universal rod 221 (Figs. 3 and 10), carried by a pair of arms 222. The arms 222 are secured on the rod 215. One of these arms, (Fig. 10), is adjacent the left side frame 54, and the other arm 222 is located adjacent the right side frame 55. Secured to the left hand arm 222 (Fig. 10) is a disk 223 having gear teeth meshing with a segment 224 pivoted on a stud 225 carried by the left side frame 54. The segment 224 has mounted thereon a pair of rollers 226, which co-operate with a pair of cam plates 227 secured to the main cam shaft 80.

When the cam shaft 80 rotates during the operation of the machine, the segment 224 rocks the arms 222 and the rod 221, first in a clockwise direction (Fig. 10), thereby permitting the actuator 216 (Fig. 3) to be rocked under the influence of the spring 220 until stopped by the end of the depressed key, unless it is prevented from moving by the zero stop pawl 62. The rod 221 advances far enough to permit nine steps of movement of the actuator 216, even though the actuator is stopped before it reaches the "nine" key.

After the actuator 216 has been positioned under control of one of the keys 50, and the rod 221 has finished its clockwise movement, a totalizer pinion 230 (Fig. 3) is moved into mesh therewith in a manner to be hereinafter described. After the totalizer pinion has been engaged with the actuator 216, the segment 224 (Fig. 10) is rocked counter-clockwise by the cam plates 227, thereby moving the rod 221 back to its normal position, which movement carries the actuator 216 back to its home position. This backward movement of the actuator 216 adds an amount on the totalizer pinion commensurate with the key depressed.

A stop is provided to prevent overthrow of the arms 222 and the universal rod 221 (Fig. 10). The arm 222, which is adjacent to the left side frame 54, is provided with a surface 231 which engages a stud 232 on the left side frame 54, when the arm 222 is in its normal position. A surface 233 engages the stud 232 when the arm 222 is rocked to its extreme moved position, thereby limiting its movement. Thus, the stud 232 limits the movement of the arms 222 and rod 221 in both directions.

*Transaction bank differential mechanism*

An actuator 216 is also provided for the transaction bank, but this actuator is only used for adjusting the type carriers and indicators in a manner to be hereinafter described. It is sufficient to say here that there is no totalizer pinion 230 adjacent to the actuator 216 for the transaction bank.

*Special counters*

The usual form of step-by-step counter is provided for counting the number of times the machine is operated. This type of counter is old and well known in the art, and therefore, only a brief description thereof will be given herein.

Mounted on the disk 223 (Fig. 10) is a stud 236 engaged by a bifurcated arm 237 secured to a shaft 238 carried by flanges 239 (Fig. 3) of a bracket 240. The bracket 240 is secured to a back frame 241 of the machine and adjacent to an opening 242 in the frame 241. Also secured to the shaft 238 is an arm 243 (Fig. 10), which has pivoted thereto a pawl 244 held in engagement with a ratchet wheel 245 by a spring 246. The ratchet wheel 245 is connected to the units counter wheel by a sleeve 247.

It will be remembered that the disk 223 is given a clockwise and counter-clockwise movement during each operation of the machine. This movement of the disk 223 rocks the arm 237, and by shaft 238, rocks the arm 243 first counter-clockwise and then clockwise. The clockwise movement of the arm 243 rotates the ratchet wheel 245 one step by the pawl 244, thereby adding "one" into the units wheel of the special counter.

The well known Geneva transfer mechanism shown in Fig. 3 is provided for transferring "1" to the next higher order when the lower order wheel passes from 9 to zero. Each counter wheel is provided with a long tooth 248 (Fig. 3), to engage a gear 249 as the wheel is passing from "nine" to "zero," by means of which one step of movement is transferred to the pinion on the next higher order element. A locking plate 250 is provided which co-operates with a locking disk 251 on the counter wheels, and prevents rotation of the counter wheels except when a transfer is being effected.

It is necessary to read the counter from the rear of the machine and for this reason a bracket 240 is provided with the opening 242 (Fig. 3) which provides means for displaying the number on the special counter.

*Totalizers*

The machine is provided with two interspersed totalizers, each consisting of a set of pinions 230 (Fig. 15). A mechanism, to be presently described, is provided for shifting the pinions 230 into position so that one set will be rocked into engagement with the actuators 216. The totalizer pinions 230 are all rotatably supported on a sleeve 259 (Figs. 3 and 15) slidably mounted on a shaft 260 supported by two arms 261. The arms 261 are secured to a shaft 262, carried by the side frames 54 and 55 of the machine. Also secured to the shaft 262 is an arm 263 (Figs. 5 and 15) having pivoted thereto a link 264 at its upper end. The link 264 is provided with a stud 265, adapted to be moved into a notch 266 (see also Fig. 6), of an arm 267 during adding operations in a manner to be hereinafter described. The arm 267 is provided with a roller 268 which projects into a cam slot in a cam disk 269 (Fig. 6). The cam race in the disk 269 is so timed that, during the operation of the machine, the totalizer pinions are engaged and disengaged from the actuators 216 at the proper time. The totalizer pinions 230 (Fig. 3) are held in alignment on the sleeve 259 by spacing collars 270 (Fig. 15).

Aligning devices are provided for maintaining the totalizer pinions in proper alignment when they are disengaged from the actuators 216. Secured to the shaft 262 (Fig. 3) adjacent to each actuator 216 is an arm 275 having pivoted thereon an aliner 276. The aliner is held in engagement with a stud 277 carried by the arm 275 by a spring 278. The stud 277 is so located as to permit the nose of the aliner to be in contact with its totalizer pinion 230 when the totalizer is disengaged. As the totalizer moves into engagement with the actuator, the tail 279 of the aliner strikes a flange 280 formed on a plate secured to a cross bar 281 (see also Figs. 15 and 18), thereby causing the aliner to be rocked far enough to disengage its nose from the totalizer pinion.

As the totalizer becomes disengaged from the actuator and the tail 279 disengages from the flange 280, the spring 278 rocks the aliner 276 into engagement with the totalizer pinion, thereby holding it in alinement. These parts are so arranged that the aliner becomes disengaged at the time the totalizer pinion begins to engage the actuator 216 and again becomes disengaged just before the totalizer pinion becomes entirely disengaged from the actuator.

A spring actuated aliner 282 is provided for alining the totalizer frame when the totalizer is in its engaged position. This aliner is held against a stud 283 carried by the arm 275, by a spring 284. As the totalizer becomes engaged, the stud 283 becomes disengaged from a surface 285 on the aliner, thereby permitting the spring 284 to rock a cam portion of the aliner into engagement with the stud 283, to limit the amount of movement of the totalizer frame into position to cause the pinions 230 to properly engage the teeth 217 of the actuators.

Another alining means is provided for holding the totalizer pinions 230 of the totalizer which is not engaged, against rotation. This means consists of a bar 286 (Figs. 3 and 15), notched to permit free rotation of the engaged pinions. However, the pinions which are not in position to be engaged with the actuators are held against rotation by the bar 286.

*Transfer mechanism*

Figure 2:
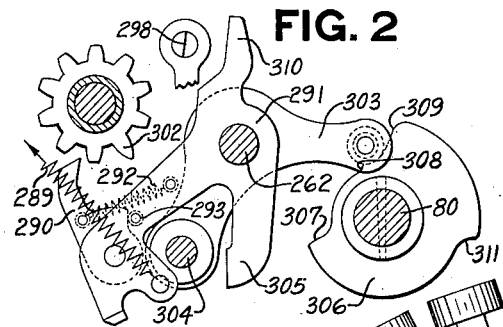
Fig. 2 is a detail view of the transfer mechanism operating means.

A transfer mechanism has been provided for the totalizers for carrying "one" to the next higher order pinion when the lower order pinion passes from "9" to "zero". A transfer carrying pawl 290 (Fig. 2) is pivoted on an arm 291 and held in its normal position by a spring 292. A stud 293 on the arm 291 limits the movement of the pawl under influence of the spring 292. The arm 291 is loosely pivoted on the shaft 262 and normally tends to rock in clockwise direction (Fig. 2) under the influence of a spring 289, but is prevented from doing so by a flange 294 (Fig. 8), formed on the arm 291, which engages a downwardly extending arm 295 of a bell crank 296. One end of the spring 289 is attached to a stud on the arm 291 and the other end is attached to a spring hook 288. These spring hooks are formed alternately with the flanges 280 (see also Figs. 15 and 18). The bell crank 296 normally tends to rock in a clockwise direction due to a spring 297, but is prevented from doing so by a stud 298, engaging a shoulder on a transfer trip pawl 300. The trip pawl 300 is pivoted on the arm 275, which is secured to shaft 262. The shoulder on the pawl 300 is held in engagement with the stud 298 by a spring 301, one end being attached to a stud on the trip pawl 300 and the other end to a stud on the arm 275.

When the totalizer pinion of lower order passes from "9" to "zero," its long tooth 302 (Fig. 8) engages the trip pawl 300, thereby disengaging the shoulder on the pawl 300 from the stud 298 and permitting the spring 297 to rock the bell crank 296 far enough to disengage the arm 295 from the flange 294. The disengagement of the arm 295 from the flange 294 permits the arm 291 for the next higher order to release for carrying "one" into the next higher order totalizer pinion 230. However, at this time, the totalizer is engaged with its actuators, as above described, and therefore the totalizer pinion of next higher order is not in position to be actuated by the carrying pawl 290. For this reason, means must be provided for delaying the action of the arm 291 until the totalizer is disengaged from the actuators and moved into position to be operated upon by the pawl 290. To accomplish this, a pair of arms 303 (Fig. 2), pivoted on the shaft 262 has been provided, which carry a universal rod 304 extending across the path of a downwardly extending arm 305 on each of the arms 291. The arms 303 are each provided with a roller, each held in engagement with a cam 306 (Figs. 2 and 15) on the main cam shaft 80, by a spring 312 (Fig. 11).

At the beginning of the operation of the machine a rise 309 on the cams 306 rocks the arms 303 far enough to cause the rod 304 to engage the downwardly extending arms 305, and to rock them in counter-clockwise direction for restoring all of the transfer trip pawls which were tripped during the previous operation. Upon further rotation of the cams 306, a drop 311 on each cam permits the arms 303 to move back toward their normal positions to permit the transfer trip pawls to be tripped in a manner to be presently described. After all the pawls which are to effect a transfer have been tripped, and after the totalizer has been disengaged from the actuators, a drop 307 on each cam 306 permits the arms 303 to rock in clockwise direction to permit the rod 304 to move away from the arms 305, thus permitting the tripped carrying pawls 290 to effect the transfer.

From the above it will be seen that all of the carrying pawls which are tripped during the entry of the items are moved simultaneously to effect the transfer in the various orders. However, if there is to be a transfer upon a transfer, as for example, when all the higher order wheels are standing at "nine" and "one" is carried into the lower of these, then the transfers will be effected one after the other. When a transfer is effected after the rod 304 has been moved away from the arms 305, and the pinion into which the transfer is carried turns from "nine" to "zero", the long tooth 302 thereof strips the pawl 300 to permit the bell crank 296 to be moved away from the flange 294, thereby permitting the arm 291 to move under the action of the spring 289 to effect the transfer into the next higher order.

At the end of a transfer movement of the carrying pawl 290, the pawl is in engagement with the tooth on the totalizer pinion into which the transfer has been carried. The cams 306 (Fig. 2) are each provided with a rise 308, which withdraws the pawl 290 from engagement with the tooth, just at the end of the operation of the machine, so that the liner can accurately line up the pinions and also for permitting free movement of the totalizer frame when the frame is being shifted for selecting another totalizer.

The arms 291, which are tripped for effecting transfers, are not restored until the beginning of the next succeeding cycle of operation. At the beginning of the operation of the machine, the rises 309 (Fig. 2) of the cams 306 rock an upwardly extending finger 310 on the arm 291 forward toward the stud 298. This movement is sufficient to move the finger 310 into contact with the stud 298. Since the bell crank 296 (Fig. 3), is carried by the arm 275, and the arm 275 is secured to the shaft 262, upon which the totalizer frame is also secured, it will be seen that when the totalizer engages its actuators, the stud 298 is rocked toward the finger 310 of the arm 291. It is this engaging movement of the totalizer with its actuators that causes the stud 298 on the bell crank 296 to be restored to engagement with the shoulder on the transfer trip pawl 300, as shown in Fig. 8. The upwardly extending finger 310 merely acts as a stop, and the engaging movement of the totalizer causes the stud 298 to be shifted behind the shoulder.

After all the transfer carrying pawls are restored, as just described, it is necessary to move the finger 310 away from the stud 298 so that the arm 295 will be free to rock when the transfer trip pawls 300 are released. The drop 311 on each cam 306 is provided for permitting the arms 303 to rock far enough clockwise to withdraw said finger 310 from the stud 298.

*Totalizer selecting means*

As before mentioned, the machine is provided with two totalizers mounted on the sleeve 259 (Figs. 3 and 15) which are adapted to be shifted laterally therewith for selection. The sleeve is shifted by a manually operable lever 319 (Figs. 1, 5, 15 and 18). The right-hand end of the sleeve 259 has secured thereto a collar 320 (Figs. 15, 18 and 20) engaged by an upwardly extending arm 321 of a totalizer selecting slide 322. The totalizer selecting slide 322 is slidably mounted on the cross bar 281 and is provided with a rack 323 (Fig. 20), meshing with a pinion 324 secured to a shaft 325. An arm 326 (Figs. 15, 18 and 26) having two forwardly extending flanges 327 is provided with a hub telescoping over the hub of the pinion 324 which hubs are pinned to the shaft 325. The lever 319 has rearwardly extending flanges 328 by means of which the lever 319 is pivoted to the flanges 327 of the arm 326, thereby forming a connection between the lever 319 and the shaft 325.

The lever 319 is provided with a finger 330 (Figs. 5, 15 and 18), which enters one of the notches 331 of a plate 332 secured by studs 356 and 359, to the cross bar 281 when the lever is in either of its two effective positions. The finger is held within the notches 331 by a spring 333 (Fig. 5) connected to an arm 334 loose on a stud 335 carried by the right-hand frame 55. The arm 334 is secured to an arm 338, provided with a flange 336 (see also Figs. 15 and 18), held in contact with the lower end 337 (Fig. 15) of the lever 319. The end 337, of the lever 319, is held against the end of the shaft 325. When the lower end of the lever 319 is held in contact with the shaft 325 by the spring 333, the finger 330 is held in one of the notches 331. When it is desired to shift the lever 319 to select a totalizer, the upper end of the lever 319 is first pressed rearwardly, against the tension of the spring 333, until the finger 330 is withdrawn from the notch 331. This will free the lever 319 to permit it to be rocked either to the right or to the left, as the case may be. This rocking of the lever 319 rocks the shaft 325, and the pinion 324 and rack 323 shifts the totalizer selecting slide 322 to shift the desired totalizer into position to engage the actuators.

The slide 322 is provided with alining notches 340 (Fig. 15), into which an aligner 341 on the arm 263 projects (see also Fig. 5). The arm 263 is rocked to engage a totalizer with the actuators, and therefore, as the totalizer begins to engage the actuators, the arm 341 enters the notches 340, and in this manner holds the totalizer wheels in proper alinement.

An interlock is provided between the lever 319 and the machine releasing mechanism, so that the machine cannot be released when the lever is out of its effective position. When the lever is pressed rearwardly preparatory to shifting it, the arm 334 (Fig. 5) is rocked far enough to position its upper end into the path of a stud 342 on the link 110. The link 110 is lowered when the machine is released, and therefore, it can be seen that so long as the arm 334 is in the path of the stud 342 the machine cannot be released. This also provides a means for preventing movement of the lever 319 when the machine is released. After the machine is released, the stud 342 is in the path of the arm 334, and therefore, the lever 319 cannot be pressed rearwardly to withdraw the finger 330 from the notch 331.

Totalizer selecting lever lock

A lock 350 (Figs. 15, 16, 17 and 18) has been provided for locking the totalizer selecting lever out of either of its effective positions, or in its neutral position. This lock is provided with two lock bolts, each of which is operated by a different key, and each of which locks the lever out of one of its effective positions. The lock 350 is secured to the cross bar 281 by screws. The forward bolt 351 (Figs. 16, 17 and 18) is operated by a tumbler 352 which is thrown by a key 353 (Fig. 16). This key has a web 354 for engaging the tumbler 352. The bolt 351 has pivoted thereto at 357 a lever 355 (Fig. 18), pivoted on the stud 356 in the frame 281. The lever 355 is moved into the path of the finger 330 when the lock bolt 351 is thrown. Thus, for instance, if the right-hand position of the lever 319 is assigned to clerk 'A', this clerk, by moving the lever 319 to the left until the finger 330 is to the left of the lever 355, can throw the bolt 351 of the lock 350 by means of the key 353 and tumbler 352, to position the lever 355 in the path of the finger 330, thereby preventing clerk 'B' from moving the lever to select clerk 'A's' totalizer.

The lock is provided with a second bolt 360 (Fig. 16) adapted to be operated by a key 361 (Fig. 19), the key 361 being in possession of clerk 'B'. Clerk 'B' can insert the key 361 in the same barrel that clerk 'A' inserts the key 352, but clerk 'B's' key 361 cannot operate the bolt 351 inasmuch as it has a recess opposite the tumbler 352. However, the key 361 is provided with a web 362 which contacts the tumbler 364 to throw the bolt 360. This bolt 360 has connected thereto at 358 a lever 363 pivoted on the stud 356. The lever 363 is moved into the path of the finger 330 of the lever 319 when the bolt 360 is thrown. Thus clerk 'B' can prevent clerk 'A' from moving the totalizer selecting lever 319 into position to select 'B's' totalizer.

If both clerks desire to leave the machine at the same time, the lever 319 can be locked between the levers 355 and 363, and in this manner prevent shifting of the lever 319 to either of its effective positions, and then neither of the clerk's totalizers can be selected.

Indicators

As shown in Fig. 1, the machine is provided with a series of indicators 420, for indicating the data printed on the telegram blank and detail strip, and also the amount entered into the totalizer. The indicators, disclosed herein, are first restored to zero position, and then set up according to the amount of differential movement given to the totalizer actuators.

Each indicator is adjusted by a segment 421 (Fig. 3), loosely mounted on the rod 215, and meshing with a gear 422. One of the gears 422 is secured to the end of a shaft 423 and one is secured to the end of each sleeve 424. Each gear 422 meshes with a gear 425, loosely mounted on a rod 426 carried by the side frames 54 and 55. The gear 425 meshes with a pinion 427 secured to the indicator 420. When the rod 221 moves forwardly for setting the actuator 216, the rod contacts the surface 429 on the segment 421 and moves the segment far enough in clockwise direction to return the indicator 420 to its zero position. In this position the gear 425 is stopped by a rod 430 which passes through slots cut in the gears 425 and acts as a positive stop for the indicators when they reach their zero positions.

A coupling pinion 440 (Figs. 3 and 9) is provided for each differential mechanism for coupling the actuator 216 with the segment 421. The coupling pinion 440 is normally in mesh with the actuator 216 and with the segment 421, but at the beginning of the operation of the machine the pinion is moved out of mesh therefrom long enough to permit the actuator 216 to be adjusted under control of the depressed key, and for permitting the rod 221 to restore the segment 421, as above described. After the actuator 216 has been adjusted, the coupling pinion 440 is again moved into mesh and the actuator is returned to its home position. This return movement of the actuator is transmitted to the indicator 420 by the segment 421 and the train of gears above described. Thus the indicator is set according to the key depressed.

The coupling pinions 440 are all loosely mounted on a rod 441 (Figs. 3 and 9), carried by two arms 442, secured to a shaft 443. Also secured to the shaft is an arm 444 (Fig. 9). The arm 444 is provided with a stud 445 embraced by a notch in a link 446, guided at its upper end by a stud 447, which projects into a slot in the repeat release key 164. The lower end of the link 446 is pivoted to an arm 448 secured to the shaft 210. Secured to the shaft 210 is an arm 449 (Fig. 5) provided with a roller 450 projecting into a cam groove 451 on one side of a cam 452. The cam is secured to the main cam shaft 80 and is provided with a cam groove on each side.

At the beginning of an operation of the machine, the cam groove 451 rocks the shaft 210 by the arm 449, thereby lowering the arm 448 (Fig. 9) and link 446. The lowering of the link 446 rocks the arm 444 and shaft 443 in counterclockwise direction, thereby rocking the arms 442 and the coupling pinions 440 counter-clockwise far enough to move them from the actuators 216 and the segments 421.

After the actuators 216 have been positioned according to the depressed keys and all the segments 421 have been moved to their zero positions, the cam groove 451 through the mechanism actuated thereby moves the coupling pinions back into mesh with the actuators and segments. After the coupling pinions have been remeshed, the rod 221 returns the actuators to their home positions to adjust the indicators as above described.

From the above description it is apparent that at the end of the operation of the machine, the indicators and the train of mechanism connected thereto are left set in the positions corresponding to the values of the keys depressed during the previous operation. However, the actuators 216 are all brought back to their home positions. Therefore, these actuators are in their home positions when the machine is in its normal or home position.

Coupling pinion alining device

In order to keep the coupling pinions 440 in proper alinement when they are disengaged, so that upon subsequent engagement they will properly mesh with the actuators 216 and segments 421, an aliner 468 (Fig. 3) secured to the back frame 241, has been provided. When the coupling pinions 440 become disengaged from the actuators 216 and segments 421, they engage the aliner 468 thereby holding them against rotation.

Indicator alining device

In order to maintain the indicators in their adjusted positions, alining devices have been provided which are rocked into engagement with the pinions 427 (Fig. 3) on the indicators, after the indicators have been adjusted.

The indicator aliners are operated by a cam 470 (Figs. 3 and 15), secured to the main cam shaft 80. Secured to a shaft 473 (Fig. 3) is an arm 474, provided with a roller 475, held in engagement with the cam 470 by a spring 476 attached to an arm 477 secured to the shaft 473. Pivoted to the arm 474 is a link 478 the upper end of which is pivoted to an arm 479 secured to a shaft 480. The shaft 480 has secured thereon an aliner 481 for each indicator. At the beginning of the operation of the machine, the cam 470 rocks the arm 474 to lower the link 478, thereby disengaging all of the aliners 481 from the pinions 427. After the indicators have been adjusted, as above described, the cam 470 again rocks the aliners 481 into engagement with the pinions 427, thereby holding them in alinement until the succeeding operation.

An alining device has been provided in each bank for properly alining the actuator 216 and the segment 421. Each alining pawl 482 (Fig. 3), which is wide enough to engage both the actuator 216 and the segment 421, is secured to the shaft 473. One of the alining pawls 482 is formed on the forward end of the arm 474, which has mounted thereon the roller 475, held in engagement with the cam 470 on the main cam shaft 80, by the spring 476.

The cam 470 is so timed that each alining pawl 482 moves out of engagement just before the rod 221 moves forwardly to permit the actuator 216 to operate. Just before the totalizer engages the actuators, the alining pawl is reengaged with the actuator and segment to properly aline them, but it is again disengaged before the actuator and segment are returned by the rod 221. After the actuator and segment have been properly restored, the aliner is again engaged to prevent movement of the actuator and segment.

Type carriers

As above mentioned, the shaft 423 (Fig. 3) and each sleeve 424 have secured on their left hand ends gears 422, which are adjusted according to the differential movements of the actuators 216. The other ends of the sleeves 424 and the shaft 423, have secured thereon gears 485, (Fig. 21) each of which meshes with a pinion 486 secured to a corresponding type carrier 487. The pinion 486 meshes with an idler gear 488 which meshes with a pinion 489 on type carrier 490. The gears 485 also mesh with pinions 491 and 492 secured to type carriers 493 and 494, respectively. Thus it is seen that the differential movement of the actuators 216 is transmitted to the type carriers 487, 490, 493 and 494. There is a set of type carriers provided for each bank of keys, and therefore, the data set-up on the keyboard is set up on the type carriers. All of the type carriers are loosely supported on shafts 496, 497, 498 and 499, respectively.

Type carrier aliners

Figure 21:
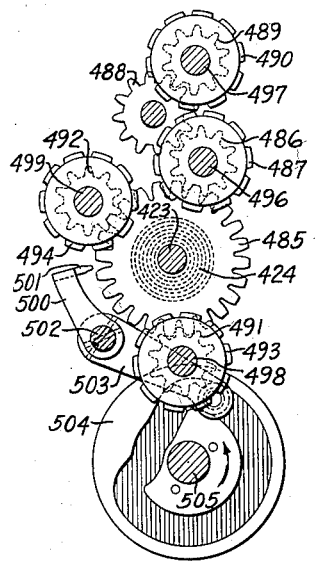
Fig. 21 is a detail view showing the four type lines and the alining mechanism therefor.
Figure 29:
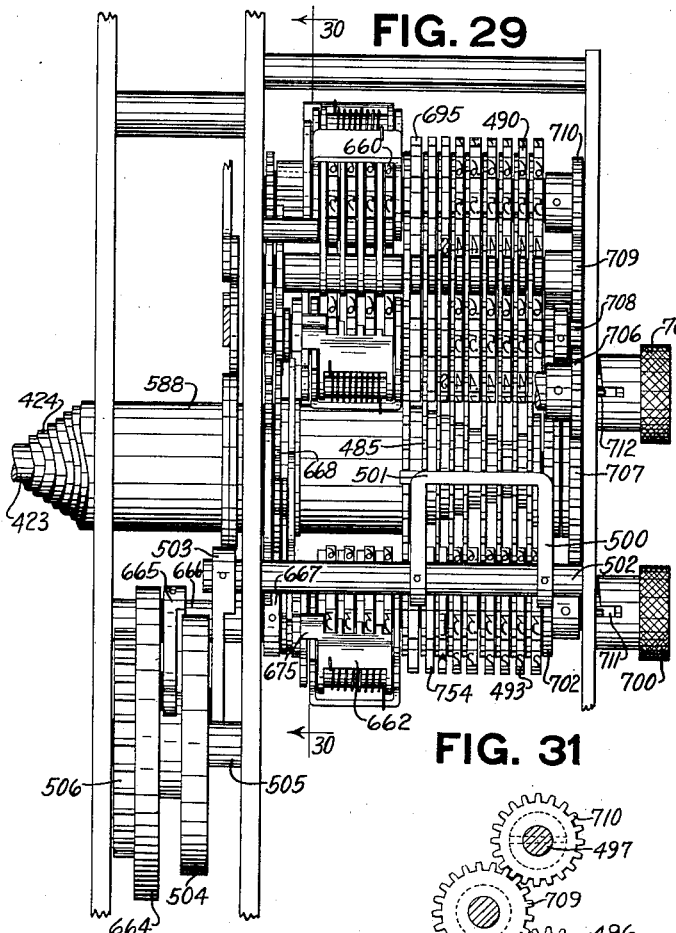
Fig. 29 is a front elevation of the type wheel lines.

A device has been provided for properly alining the type carriers after they have been adjusted by the differential mechanism. This device consists of a yoke 500 (Figs. 21 and 29) having an alining tooth 501, which projects across all of the gears 485, to engage between the teeth thereof. The yoke 500 is secured to a shaft 502 to which is also secured an arm 503 actuated by a cam 504 on an auxiliary shaft 505 (Figs. 21 and 29). The shaft 505 is driven by the idler gear 99 (Fig. 27) which meshes with the gear 100 on the main cam shaft 80 and a gear 506 on the auxiliary shaft 505.

Repeat release key mechanism

The repeat mechanism provided in this machine is characterized by the fact that the operator need not know at the time of making the original entry that the amount is to be repeated. A previous amount can be repeated at any time after the operation is completed, so long as no other keys have been depressed in any of the amount banks. In repeat mechanisms, heretofore known in the art, it is usually necessary to make a preliminary setting before the original amount is entered, in order that the amount may be later repeated. This preliminary setting is entirely unnecessary in the present invention. This type of repeat mechanism is particularly useful in the system to which it is shown adapted herein. Any number of customers may send messages for which the charges are the same, and therefore, the customers can be more speedily served by a special repeat release mechanism such as has been provided herein. All that the clerk need do is to glance at the indicators, and if they show the same amount as that which is to be charged for the next message, he presses the repeat release key and the machine will be released to enter the amount. The repeat mechanism is also useful when a customer sends telegrams in "batches," the individual telegrams each costing the same. The clerk can then enter all the telegrams by simply inserting a blank and, after the first entry has been made, pressing the repeat key a number of times equal to the number of telegrams in the batch, less one. However, it is apparent that the repeat mechanism is useful in a great many other lines of business, and it is not desired to limit it to this particular system.

It will be remembered that the segment 421 is left standing, at the end of the operation of the machine, in the position to which it was adjusted under control of the depressed key, and that the actuator 216 is always restored to its home position. During repeat operations, the segment 421 and the gears 422 and 425, together with the rod 430, are used for controlling the positioning of the actuator 216. During repeat operations none of the keys 50 (Fig. 1) is depressed, and therefore, the actuators 216 will move up until stopped by some other means besides the keys 50. This means consists of the rod 430, which stops the gear 425, and through the gear 422, stops the segment 421 in its zero position, as above described.

Depression of the repeat release key 154 (Fig. 9) disconnects the link 446 from the stud 445, and therefore, when the machine starts to operate, the coupling pinion 440 will not be disengaged from the actuators 216 and the segments 421. A slot 401, cut in the lower end of the key 164 embraces the stud 445 thereby holding the arm 444 and pinions 440 in positive alinement when the repeat release key is depressed. Thus, when the rod 221 (Fig. 3) receives its forward movement to restore the segments 421 to their zero positions, the actuators 216 are moved a like distance, thereby setting up in the actuators the amount previously standing on the segments 421. During the return movement of the rod 221, the coupling pinions remain engaged with the actuators and segments, and therefore, the actuators 216 are returned to their home positions and the segments 421 are returned to the positions in which they were standing at the beginning of the repeat operation.

During the repeat operation, the totalizer is engaged and disengaged from the actuators 216 at the same time as during an ordinary adding operation, and therefore, the amount previously standing on the segments 421 is again added into the totalizer pinions. Simultaneously, the indicators and type carriers are adjusted in the same manner as before described for an adding operation.

The means for disconnecting the link 446 (Fig. 9) from the stud 445 consists of a slot in the repeat release key 164 through which the stud 447 projects. Depression of the key 164 rocks the link 446 in a clockwise direction by the stud 447, until it becomes disengaged from the stud 445.

It is not necessary to depress the motor bar 76 to release the machine for a repeat operation.

Depression of the key 164 rocks a stud 510 (Figs. 9 and 14), into a slot 511 of an arm 512, secured to a shaft 513. The slot 511 is so formed that when the stud 510 enters therein, the arm 512, together with the shaft 513, is rocked counter clockwise (Fig. 9). The counter-clockwise movement of the shaft 513 rocks an arm 514 (Fig. 5) secured to the shaft, counter-clockwise far enough for a stud 515 thereon to engage the lower end of the release pawl 114. The counter-clockwise movement of the arm 514 moves the pawl 114 clockwise thereby withdrawing said pawl 114 from beneath the flange 113 on the link 110 to release the machine in identically the same manner as was described for releasing the machine by the motor bar 76.

The arm 512, shaft 513, and arm 514 are held in normal positions by a spring 516 (Fig. 9) coiled around the hub of the arm 512 and each end bearing against a stud 517 carried by the arm 512. The extreme ends of the spring 516 also normally bear against a stud 518 secured in the left side frame 54 of the machine. When the stud 510 on the repeat release key 164 cams the arm 512 counter-clockwise, the left hand end (Fig. 9) of the spring 516 is tensioned and the right hand end of the spring is held against the stud 518. Upon release of the repeat release key, the left hand end of the spring 516, bearing against the stud 517, returns the arm 512 to its normal position and the spring will again engage the left hand side of the stud 518.

The arm 512 is also adapted to be rocked in a clockwise direction by the total lever in a manner to be hereinafter described. When the arm 512 is rocked clockwise, the spring 516 returns the arm 512 to its normal or home position, just as described for the returning of the arm 512 after the repeat release key 164 is released.

A spring 519 (Fig. 9) is provided for maintaining the repeat release key in its normal or home position. A stud 520 secured to the left side frame 54, provides a stop for the repeat release key, thereby limiting the movement thereof under the influence of the spring 519. A stud 521 also secured to the left side frame 54 provides a stop for limiting the downward movement of the repeat release key when it is depressed to release the machine.

When the arm 512 is rocked clockwise under the influence of the total lever (to be hereinafter described), the upper surface 522 thereof is rocked beneath the stud 510, thereby locking out the repeat release key after the total lever has been moved out of its "add" position.

As previously stated, during a repeat operation the differentially movable actuator 216 is moved under control of the segment 421. For this reason it is necessary to rock the zero stop pawl 62 out of its effective position during repeat operations. As before described, when an amount key is depressed, the zero stop pawl is moved into ineffective position. However, during repeat operations none of the amount keys are depressed, and therefore, another means is provided for rocking the zero stop pawls to their ineffective positions during repeat operations. The repeat release key is provided with a stud 530 (Figs. 9 and 14), which upon depression thereof, enters a slot 531 in an arm 532, secured to the shaft 533. Also secured to the shaft 533 for each bank is an arm 534 (Figs. 3 and 14), provided with a stud 535, adapted to engage the zero stop pawl 62 and rock it to its ineffective position, upon depression of the repeat release key.

The arm 534 is also provided with a flange 536, which is rocked into the path of a pawl 537, pivoted on the flexible detent 57. Thus, when the arm 534 is rocked by the depression of the repeat release key, the flexible detent 57 is locked against movement, and therefore, no key can be depressed in these banks after the repeat release key has been depressed.

*Key release throwout mechanism*

It will be remembered that the cam 181 (Fig. 9), by operating the pitman 178, through arms 175 and 173, rocks the shaft 160 to lower the flexible detent 57, for releasing the keys at the end of the operation of the machine. During repeat operations, as just described, the arms 534 (Figs. 3 and 12) are rocked far enough to cause the flange 536 thereon to be moved beneath the pawl 537, thereby locking the detent 57 against operation. For this reason it is necessary during repeat operations to disconnect the driving connections between the cam 181 and the shaft 160.

The arm 532 is provided with a forwardly extending arm 540 (Fig. 9) connected to the pitman 178 by a link 541. Thus when the repeat release key 164 is depressed, and the arm 532 is rocked, as above mentioned the arm 540 lowers the link 541, thereby lowering the forward end of the pitman 178 to disconnect the pitman from the stud 177 on the arm 175. Thus during repeat operations when the cam 181 is rotated, the movement transmitted to the pitman 178 is an idle one because the pitman is disconnected from the arm 175, and therefore the key release mechanism is rendered ineffective.

*Repeat release key lockout mechanism*

Means is also provided for preventing operations of the repeat release key if any one of the keys in any one of the banks has been depressed. The depression of any key rocks its respective flexible detent downwardly, thereby positioning the pawl 537 (Figs. 3 and 12) on the detent 57 in the path of the flange 536 on the arm 534. It will be recalled that all of the arms 534 are secured to the shaft 533, and therefore, if any one of the pawls 537 is in the path of its corresponding arm 534, the repeat release key cannot be depressed, As previously stated, the yoke 157 (Fig. 9) is provided with an upwardly extending arm 163, for preventing depression of the repeat release key after the machine has been released for an adding operation. The arm 163 is provided with a surface 542 rocked beneath the stud 530 on the repeat release key, when the machine is released for operation by the motor bar 76, thereby locking out the repeat release key.

The arm 163 is so formed that the machine can be released by depression of the repeat release key. The arm 163 has a recess 543 (Fig. 9) so that when the repeat release key has been entirely depressed and the yoke 157 is rocked clockwise, the recess 543 will pass over the stud 530, thereby permitting the machine to release.

Detail strips

The machine is provided with two detail strips, one for each of the totalizers. Each detail strip provides a separate and independent record for each totalizer inasmuch as the printing hammer corresponding to each detail strip is selected by the totalizer selecting means. Thus, when an amount is entered into any one of the totalizers, this amount is printed on the detail strip appropriate to that totalizer. The feeding mechanism for each detail strip is also controlled by the totalizer selecting means so that only the detail strip corresponding to the selected totalizer is fed one step during the operation.

Figure 23:
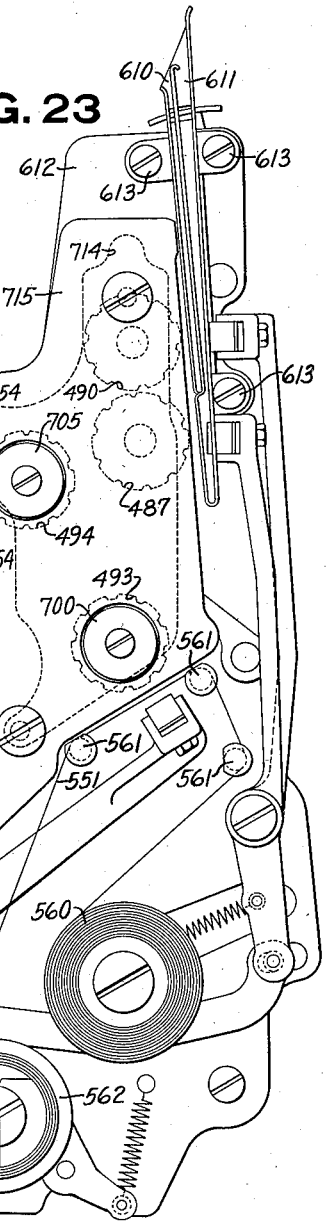
Fig. 23 is an end elevation of the printer mechanism.
Figure 37:
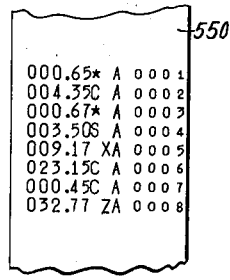
Fig. 37 is a fragmentary portion of the front detail strip.
Figure 38:
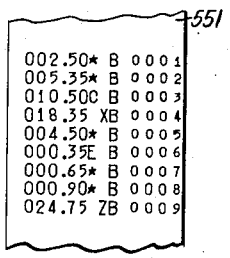
Fig. 38 is a fragmentary portion of the rear detail strip.

For convenience, the detail strip 550 (Figs. 23 and 37) will be called herein the "front" detail strip, and the strip 551 (Figs. 23 and 38) will be called the "rear" detail strip. The front detail strip 550 is fed from a supply roll 553 and around four studs 554, to a receiving roll 555. The receiving roll 555 is mounted on a stud 556 (Fig. 26), and has secured thereto a ratchet wheel 557. The rear detail strip 551 is fed from a supply roll 560 (Fig. 23) around three studs 561 to a receiving roll 562 mounted on a stud 563 (Fig. 26), and has secured thereto a ratchet wheel 564.

The ratchet wheel 557 (Fig. 26), has cooperating therewith a feed pawl 565 pivoted to one arm of a three armed lever 566. The ratchet wheel 564 has cooperating therewith a feed pawl 567 pivoted to another arm of the lever 566. Each of the pawls 565 and 567 is spring actuated and normally tends to engage its respective ratchet wheel 557 or 564. The lever 566 is operated by a cam 568 secured to the main cam shaft 80. Cooperating with the cam 568 is an arm 569 provided with a stud 570 which projects into a notch in the third arm of the lever 566. The arm 569 is provided with a roller 571 which is held in contact with the cam 568 by a spring 572 connected to the arm 566.

As the cam 568 is rotated, the lever 566 is rocked counter-clockwise by the arm 569 and its stud 570. This counter-clockwise movement rotates one of the ratchet wheels, depending upon which one has been selected by means to be hereinafter described, to move the selected detail strip forwardly one step.

Detail strip selecting means

The pawls 565 and 567 are controlled by the totalizer selecting means so that only the detail strip corresponding to the selected totalizer is fed. This means is controlled by a cam 580 (Fig. 25) on the shaft 325. This shaft is rocked by the totalizer selecting lever 319 upon selecting a totalizer. The cam 580 cooperates with a link 581 (see also Fig. 26) pivoted to a segment 582 at its upper end, and guided by a stud 583 (Fig. 25) at its lower end. The segment 582 is pivoted on the rod 215. When the shaft 325 is rocked by the lever 319, the link 581 is raised, thereby rocking the segment 582 clockwise. The segment 582 meshes with a gear 584 (Fig. 25), which has secured thereto a disk 585 connected to another disk 586 by means of a stud 579. A sleeve 588 connects the disk 586 to an arm 587. The arm 587 is connected to a lever 589 (Fig. 26), by a link 590. The lever 589 is bifurcated to engage a stud 595 carried by an arm 596 pivoted on the stud 556. The arm 596 is provided with a flange 597 which cooperates with the feed pawl 565 for the "front" detail strip.

Figure 26:
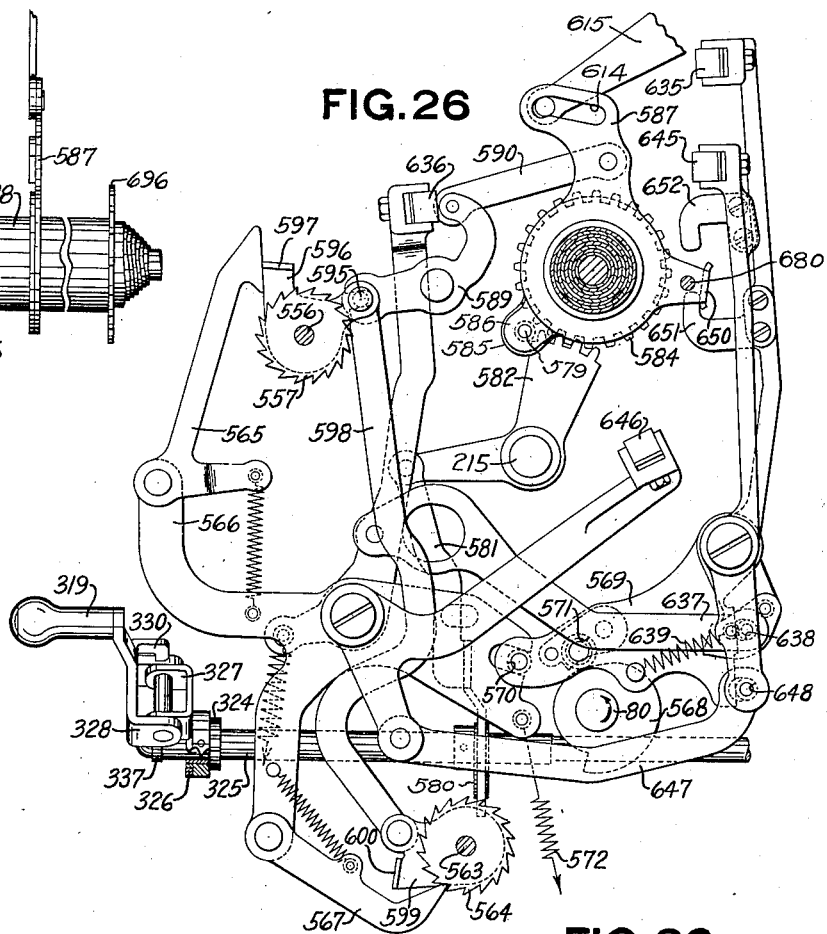
Fig. 26 is a detail view of the printing hammers, and the detail paper fee, together with the mechanism for selecting them.

When the flange 597 is in the position shown in Fig. 26 it holds the pawl 565 in its ineffective position, and therefore, when the cam 568 rocks the lever 566, the pawl 565 does not feed the "front" detail strip forwardly.

The stud 595 has also pivoted thereto a link 598 which connects the arm 596 to a similar arm 599 for the "rear" detail strip. This arm is provided with a flange 600 which cooperates with the pawl 567. With the flange 600 in the position shown in Fig. 26, the pawl 567 is in position to feed the "rear" detail strip. However, when the link 581 is raised to rock the segment 582, the arm 587 is rocked counter-clockwise (Fig. 26). This movement of the arm 587 by the link 590, and lever 589 rocks the arm 596 clockwise, thereby lowering link 598 and rocking the arm 599 counter-clockwise. This movement moves the flange 597 away from the pawl 565, and moves said flange 600 into contact with the pawl 567. Thus, the pawl 565 is permitted to move to its effective position and the pawl 567 is moved to its ineffective position. When the machine is operated with the parts in these positions the "front" detail strip is fed and the "rear" detail strip is not fed.

Slip receptacles

The machine is provided with a separate telegram blank receptacle for each totalizer. This is provided because it is desired to print data on the telegram blank corresponding to the data entered into the selected totalizer, and since a separate detail strip is provided for each totalizer, as above described, separate type lines are provided for each totalizer. A mechanism has been provided which prevents insertion of a telegram blank into the wrong receptacle.

Figure 22:
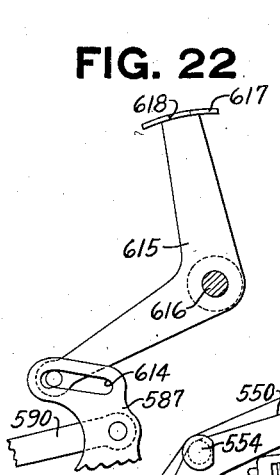
Fig. 22 is a detail view of the means for closing one of the paper receptacles shown in Fig. 23.

The "front" receptacle 610 (Fig. 23) is adapted for use when the data is being printed on the "front" detail strip, and the "rear" receptacle 611 is adapted for use when the data is printed on the "rear" detail strip. The receptacles are mounted on the printer frame 612 by screws 613. The arm 587 (Figs. 22 and 26) is provided with a slot 614 into which projects a stud on a bell crank 615 mounted on a stud 616. The bell crank 615 is provided with a flange 617 which projects into the receptacles 610 and 611. The flange 617 is provided with an opening 618 which is moved into the receptacle corresponding to the totalizer selected. Thus, when a totalizer is selected by the lever 319, the arm 587 is positioned as above described, thereby camming the bell crank 615 to present the opening 618 in the proper receptacle.

Modified form of slip receptacle selecting means

Figure 28:
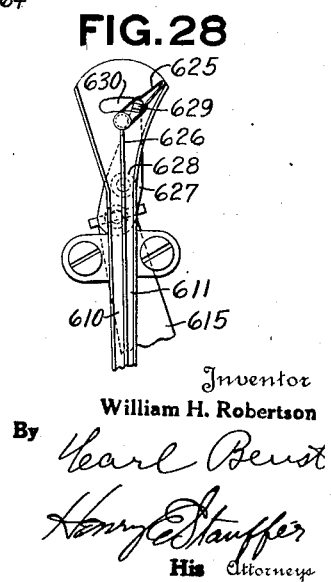
Fig. 28 is a detail view of a modified form of paper receptacle selecting means.

A modified form of means for selecting the receptacles 610 and 611 is shown in Fig. 28. In this form, a hollow flap 625 is hinged to a wall 626 which divides the receptacles 610 and 611. The bell crank 615 (Fig. 28), for the modified form, has a notched flange at its upper end cooperating with a stud on a lever 627 pivoted on a stud 628, and is provided with a laterally projecting lug 629 projecting through a slot 630 in a side wall of the receptacles and engages the flap 625. Thus, when the bell crank 615 is adjusted as above described, the lever 627 is rocked either to the right or to the left, depending on which totalizer is selected, thereby positioning the "flap" 625 to selected the proper receptacle 610 or 611.

*Printing mechanism*

As above stated, a printing mechanism is provided for each of the totalizers. A hammer 635 (Fig. 26) is provided for printing on the blank which has been inserted in the "front" receptacle 610 and is connected to a hammer 636 for the "front" detail strip by a link 637. The lower arm of the hammer 635 is provided with a stud 638 held in contact with the arm 569 by a spring (not shown but similar to a spring 639). When the cam 568 is rotated, the arm 569 is rocked clockwise as before mentioned, and when the high point on the cam passes the roller 571 the spring 572, acting on the lever 566, rotates the arm 569 rapidly in counter-clockwise direction, thereby carrying the hammers 635 and 636 toward the type lines. Momentum of the hammers 635 and 636 is sufficient to carry the hammers to take the impression after the arm 569 has been stopped by the low portion in the cam. The spring which normally holds the stud 638 in contact with the arm 569, returns the hammers to their normal positions after the impressions have been taken.

A hammer 645 (Fig. 26) has been provided for taking an impression on the telegram blank inserted in the "rear" receptacle 611. The hammer 645 is connected to a hammer 646 by a link 647 for taking the impression on the "rear" detail strip. The lower end of the hammer 645 is provided with a stud 648 held in contact with the arm 569 by the spring 639. When the cam is rotated and the arm 569 is rocked as above described, the hammers 645 and 646 are actuated to take an impression on the "rear" detail strip and on the telegram blank in the "rear" receptacle 611.

The arm 587 (Fig. 26) is provided with a flange 650 adapted to engage a projection 651 on the hammer 635 or a projection 652 on the hammer 645, depending on which totalizer has been selected. As shown in Fig. 26, the totalizer corresponding to the "rear" detail strip and "rear" receptacle has been selected, and therefore, the hammers 635 and 636 are prevented from operating by the flange 650. However, when the other totalizer is selected by adjusting the lever 319, the flange 650 is raised to engage the projection 652, thereby preventing operation of the hammers 645 and 646 and permitting operation of the hammers 635 and 636.

*Consecutive numbering devices*

Figure 34:
Fig. 34 is a detail view of one of the consecutive numbering device type wheels.

The machine is provided with four sets of consecutive numbering wheels 660 (Figs. 24, 29 and 34), each set including four wheels. One set is mounted on each of the type line shafts 496, 497, 498 and 499. During the operation of the machine, two of these sets are operated, depending upon which totalizer has been selected. One of the selected sets is for printing on the telegram blank, and the other for printing on the detail strip corresponding to the selected totalizer.

Figure 24:
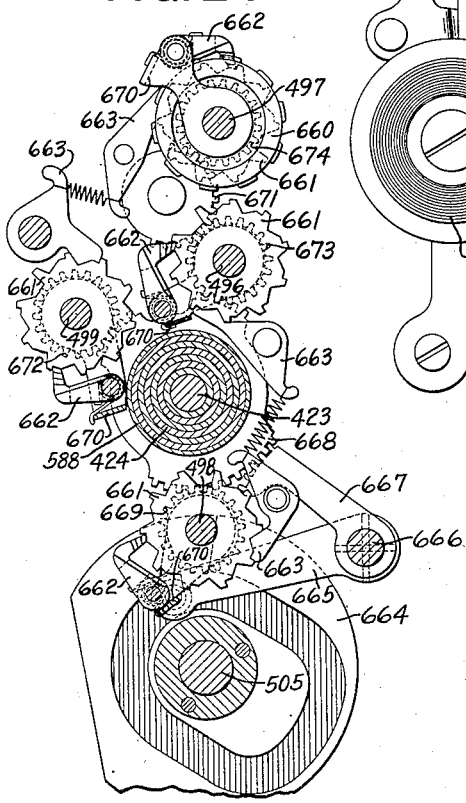
Fig. 24 is a detail view of the operating means for the consecutive numbering devices.

Each of the wheels 660 has secured thereto a rachet wheel 661 (Fig. 24). These ratchet wheels are engaged by tined pawls 662 in the usual and well known manner. Cooperating with each of the ratchet wheels 661 is a retaining pawl 663, which prevents retrograde movement thereof. The pawls 662 are operated by a cam 664 mounted on the auxiliary cam shaft 505 (see also Fig. 29). The cam 664 rocks an arm 665 secured to a shaft 666 upon which is mounted a segment 667, meshing with teeth on a disk 668. The disk 668 is loosely mounted on the sleeve 588 which surrounds the sleeves 424. The disk 668 is provided with three sets of teeth, one of which is engaged by the segment 667, just mentioned, and by a pinion 669 secured to a yoke 670, which carries one of the tined pawls 662. The other two sets of teeth of the disk 668 engage pinions 672 and 673 on the yokes 670 for the two tined pawls 662 in the center of Fig. 24. The pinion 673 meshes with a segment 671, which also meshes with a pinion 674 secured to the yoke 670 for the upper tined pawl 662.

When the cam 664 is rotated, all of the yokes 670 are rocked clockwise by the arm 665, segment 667 and the disk 668, thus moving the pawls 662 far enough to add one into the respective numbering devices. However, at this time, only two of the pawls 662 are in effective positions, as will be presently described.

Figure 30:
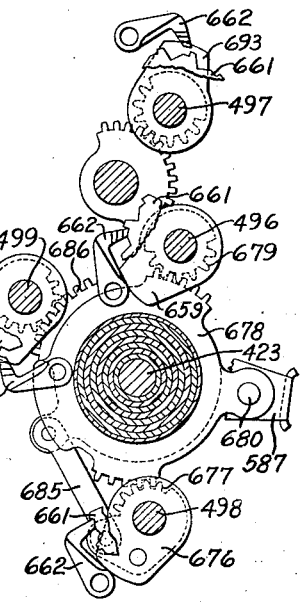
Fig. 30 is a detail view of the consecutive numbering device selecting means.

As above mentioned, the consecutive numbering devices are controlled so that only two of the tined pawls 662 are in positions to operate the respective numbering devices. Each of the tined pawls is provided with a projection 675 (see bottom of Fig. 29). Cooperating with the lower tined pawl 662 (Fig. 30), is a selecting plate 676, which has secured thereto a segment 677, which meshes with teeth on a disk 678. Cooperating with the tined pawl 662, for the ratchet wheel on the shaft 496, is a selecting plate 659 which has secured thereto a segment 679, which also meshes with teeth on the disk 678. The disk 678 is connected with the arm 587 (Fig. 26) by a stud 680 (Fig. 30). Thus, when the arm 587 is rocked, upon selection of a totalizer, the disk 678 is rocked, thereby rocking the plates 659 and 676 into contact with the projections 675 (Fig. 29) on the tined pawl 662 corresponding thereto. Thus the plates 659 and 676 raise the pawls 662 out of operative relation with the ratchet wheels 661 and when the yokes 670 (Fig. 24) are operated, the pawls are ineffective for adding into the consecutive numbering device.

Figure 32:
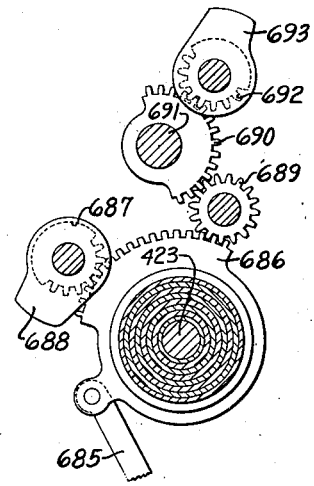
Fig. 32 is a detail view of a part of the consecutive numbering device selecting means shown in Fig. 30.

Connected to the segment 677 by a link 685 (Fig. 30), is a disk 686 (see also Fig. 32) having teeth meshing with a segment 687 secured to a selecting plate 688 which cooperates with the projection 675 on the tined pawl 662 for the front detail strip. The teeth on the disk 686 also mesh with a pinion 689, which in turn meshes with a segment 690 loosely mounted on a stud 691. The segment 690 engages a segment 692 secured to a selecting plate 693 for the upper tined pawl 662 (Fig. 30).

When the selecting plates 659 and 676 are rocked to disengage the tined pawls 662 cooperating therewith from their ratchet wheels 661, the link 685 rocks the disk 686 for disengaging the selecting plates 688 and 693 from the projections 675 of the tined pawls for the consecutive numbering devices cooperating therewith.

Thus, it is seen that when the arm 587 is shifted upon selection of a totalizer, one set of pawls 662 is moved to ineffective position, while the other set is moved to effective position. Thus, the selection of a totalizer determines the selection of the consecutive numbering devices.

Figure 25:
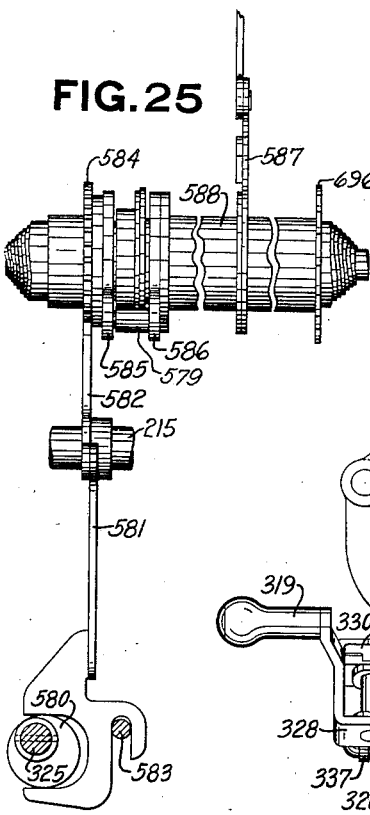
Fig. 25 is a front elevation of the mechanism for selecting the printing hammers, consecutive numbering devices and detail strip feeding mechanisms.

A special type carrier 695 (Fig. 29) is provided on each type line shaft 496, 497, 498 and 499 (Fig. 21) for recording the totalizer which is selected. These type carriers 695 are adjusted by a gear 696 (Fig. 25) similar to the gear 485 for the amount type carriers (Fig. 21). The gear 696 is sleeved to the arm 587 (Figs. 25 and 26). When a totalizer is selected and the arm 587 is adjusted as above described, the type carriers 695 are adjusted accordingly for printing the designating character. In the present application, these characters are shown as "A" and "B", representing clerks A and B.

*Consecutive numbering device turn to zero mechanism*

Figure 33:
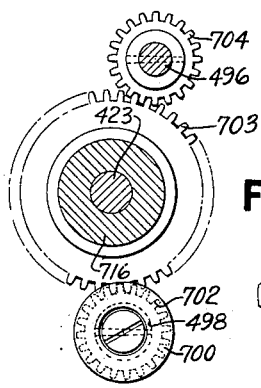
Fig. 33 is a detail view of the turn-to-zero mechanism for one set of consecutive numbering devices.

Manually operable means is provided for turning the consecutive numbering devices to zero. Two knobs have been provided, one for turning the numbering devices for each totalizer to zero independently of the other. A knob 700 (Figs. 29 and 33) is provided for turning to zero the consecutive numbering devices on the shafts 496 and 498, these being the ones corresponding to the "rear" detail strip and "rear" telegram blank receptacle. Each of the numbering type wheels is provided with the well known turn-to-zero pawl 701 (Fig. 34) engaged by a notch in the shaft upon which it is mounted. The shafts 496 and 498 are given a complete rotation by the knob 700. The shaft 498 is turned by the knob 700 which is clutched to a gear 702 secured to the shaft 498 and which meshes with a gear 703 meshing with a pinion 704 secured to the shaft 496. The gear 703 is mounted on a hollow stud 716, secured to a printer frame 714. By this train of gears, the shaft 496 is given one complete rotation upon rotation of the turn-to-zero knob 700.

Figure 31:
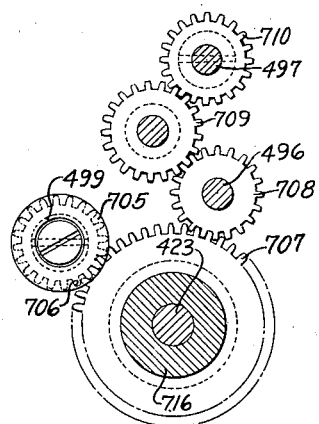
Fig. 31 is a detail view of the mechanism for turning one set of the consecutive numbering devices to zero.

A turn to zero knob 705 (Figs. 29 and 31), is provided for turning to zero the consecutive numbering devices mounted on the shafts 497 and 499. The shaft 499 is given a complete rotation by the knob 705 which is clutched to a gear 706 secured to the shaft 499. The shaft 497 is rotated by a train of gears, including a gear 706, secured to the shaft 499, meshing with a gear 707, which meshes with an idler gear 708. The gear 707 is mounted on the hollow stud 716. The idler gear 708 is loosely mounted on the shaft 496 and meshes with a gear 709, which, in turn, meshes with a gear 710 secured to the shaft 497. Thus, when the knob 705 is given a complete rotation, both the shafts 497 and 499 are given a complete rotation, and by a notch therein cooperating with pawls 701, return all of the consecutive number type wheels to zero in the well known manner.

Figure 35:
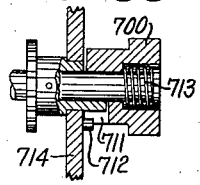
Fig. 35 is a detail view, partly in section, showing one of the consecutive numbering device turn-to-zero knobs.
Figure 36:
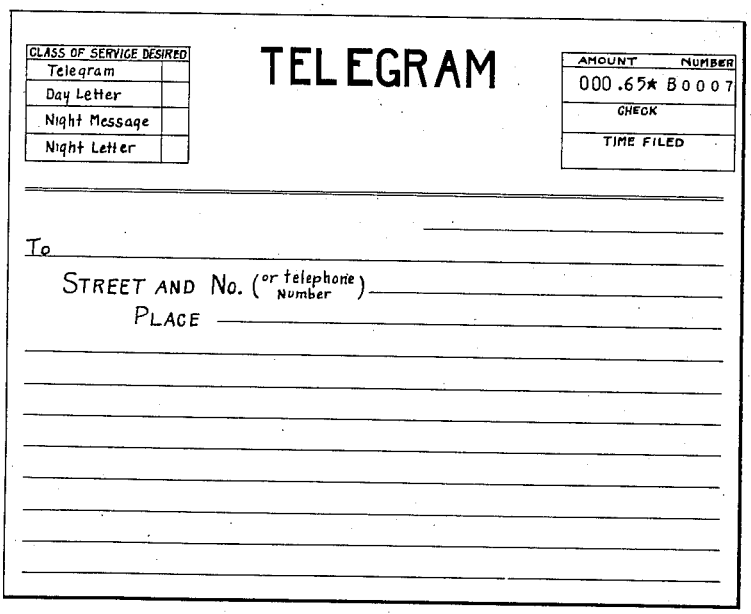
Fig. 36 is a facsimile of a telegram blank upon which the data entered in the machine is printed.

Both knobs 700 and 705 are slidably mounted on their respective shafts. Each knob is provided with a notch 711 (Fig. 35), which engages a stud 712, mounted on the right hand printer frame 714, when the knob is in its normal position. The knob is held in engagement with the stud by a spring 713. Before the knob can be rotated to turn the type wheels to zero, as described, the knob is moved laterally against the tension of the spring 713 until it is disengaged from the stud 712. The hubs of the pinions 702 and 706 are each provided with a clutch prong which engages the notch 711 (see Fig. 35) of the respective knobs 700 and 705. Thus the knobs can be shifted laterally without disconnecting them from their respective pinions.

A reversible ribbon (not shown herein) is fed through the printer in such a manner that it cooperates with all of the hammers. The ribbon is carried by studs mounted on a plate 715 (Fig. 23), which is removable, to permit a change of the ribbon. The plate 715 is secured to the frame 714 by screws.

*Total taking operation*

The machine has been described for performing adding and repeat operations. This machine is also capable of performing total taking operations. The total control lever 162 (Fig. 1) has four positions, an "add", "read", "reset" and a "non-add" position. When it is desired to read the total on a totalizer, the lever is moved to the "read" position and the machine operated in the usual manner. However, if it is desired to read the totalizer and reset it to zero, the total lever is moved to the "reset" position and an operation of the machine will cause a total to be printed and the totalizer to be reset to zero.

*Reading operations*

During "read" operations the totalizer is rocked into engagement with the actuators 216 at the beginning of the operation of the machine. Then when the universal rod 221 is moved forwardly each totalizer pinion is rotated in a backward direction until the long tooth 302 (Figs. 2, 3 and 8) is stopped by the forward end of the transfer trip pawl 300. This is the zero position of the totalizer pinions and the amount which was standing on these totalizer wheels will have been transferred to the actuators 216. Then upon return of the rod 221, the amount will again be aded on the totalizer and the indicator and type carriers will be adjusted accordingly.

The cam for controlling the engagement and disengagement of the totalizer during "read" operations is shown in Fig. 7. In order to effect this change of timing, it is necessary to engage the stud 265 (Fig. 5) with a notch 725 of an arm 726. The stud 265 is adjusted by the total lever 162. The total lever is provided with a stud 727 which projects into a cam slot 728 of an arm 729. The arm 729 is pivoted on a stud mounted in the right side frame 55 of the machine. As the total lever is raised to the "read" position, the stud 727 cooperating with the cam slot 728, rocks the arm 729 downwardly. The arm 729 is bifurcated to engage a stud 730 of the link 264. Thus, as the arm 729 is rocked, the stud 265 is engaged with the notch 725 of the arm 726.

The arm 726 is provided with a roller 732, which engages the cam race 733 in the left hand side of the cam 452 mounted on the main cam shaft 80. The cam 452 is also provided with the cam race 451 on its right hand side. However, this race 451 is omitted from Fig. 7, so as not to confuse the outline of the cam race 733. The cam race 733 is so timed as to engage the totalizer with the actuators before the actuators move, and to disengage it after the universal rod 221 is moved back to its normal position, during which movement the amount will again be added on the totalizers, and the indicators and type carriers will have been set up.

During the time the total lever 162 is being moved out of the "add" position, the totalizer has a tendency to rock into engagement with the actuators due to the springs 289 (Figs. 2 and 8) on the transfer arms 291. These arms bear against the bell cranks 295 mounted on the arms 275 secured to the shaft 262. To prevent this engagement, a cam 740 (Figs. 8 and 15), is provided and is secured to the shaft 80 in the path of a square stud 741, on a rearward extension of one of the arms 275, when the machine is home.

Before the totalizer pinions can control the differential movement of the actuators 216, it is necessary to move the zero stop pawls to their ineffective positions. The zero stop pawls are rocked to ineffective positions by a stud 745 (Figs. 5, 12 and 14), which wipes against the lower end of an arm 746, secured to the shaft 533, when the total lever is moved out of the "add" or "non-add" positions. The lower end of the arm 746 is provided with a camming surface which the stud 745 contacts thereby rocking the arm 746 in counter-clockwise direction. The counter-clockwise movement of the arm 746 rocks the shaft 533 and the arms 534 counter-clockwise thereby rocking the studs 535 thereon into engagement with the zero stop pawls 62 and in this manner moving them to their ineffective positions.

Figure 39:
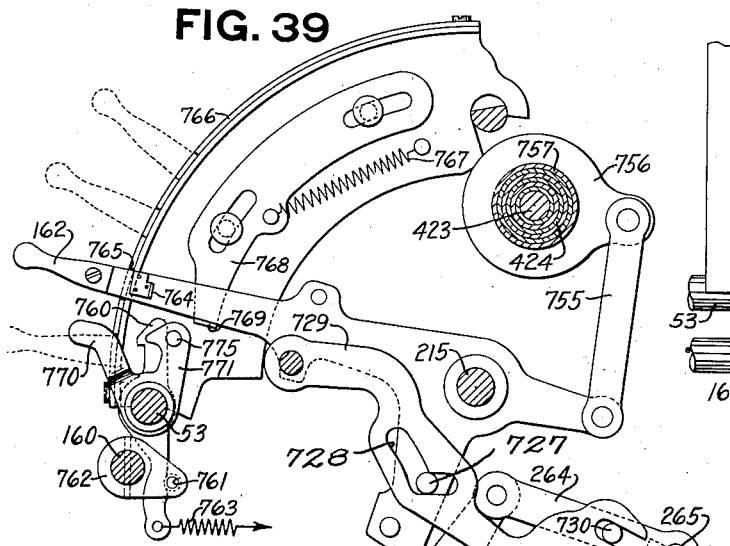
Fig. 39 is a detail view of the total control lever showing the method of controlling the totalizer engaging mechanism.

Special type wheels 754 (Fig. 29) are provided for printing a character during "read" or "reset" operations. This type wheel is adjusted by a link 755 (Fig. 39), which connects the total lever to a disk 756 secured to a sleeve 757. The sleeve 757 has secured to the other end thereof a gear 485 (Fig. 21), which adjusts the type carriers in the same manner as that described for the type carriers 487, 490, 493 and 494.

Reset operations

The "reset" operation is performed in the same manner as a "read" operation, the only difference being that the totalizer is not held in engagement with the actuators 216 while the actuators are being restored. Therefore, the amount will not be re-entered in the totalizer. To control this timing of the engagement of the totalizer, the stud 265 (Fig. 5) is moved into engagement with a bifurcated arm 449. This engagement is effected by the lever 729, and the engagement of the stud 727 on the total lever with the cam slot 728 thereof is also effected in the same manner as for "read" operations.

However, inasmuch as the "reset" position is higher (Fig. 1) than the "read" position, the total lever is moved farther, and therefore, the lever 729 is moved a greater distance.

The arm 449 is rocked by the cam race 451 in the cam 452, as before described, and the timing thereof is such that at the beginning of the operation the totalizer is engaged with the actuators and later again disengaged before the universal rod 221 is restored to its home position. Thus, it is seen that with the totalizer disengaged when the actuators 216 are restored, the amount will not be re-entered, and therefore, the totalizer will be left at zero.

"Non-add" operation

The total lever is adapted to be moved to a "non-add" position, in which position the totalizer will not be engaged with the actuators. As above mentioned, this position has been provided so that when a customer sends a "batch" of telegrams, the total charge can be entered at the time of the transaction, and then, later, when time will permit, the clerk can certify the telegrams. During this certification of the telegrams, the total lever 162 is moved to its "non-add" position, as shown in Fig. 5, which is the lowermost position thereof and is shown in dotted lines in Fig. 39. When the total lever is moved to this position, the stud 727 cooperating with the cam slot 728 moves the lever 729 to a position in which the stud 265 not engaged with any of the arms 267, 449 or 726. The positions which the various parts assume when the total lever is in the "non-add" position is shown in Fig. 5.

Figure 41:
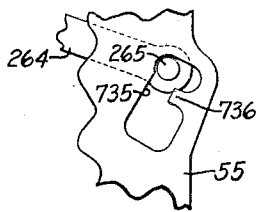
Fig. 41 is a detail view showing the slot in the right side frame of the machine for preventing movement of the totalizer engaging mechanism during "non-add" operations.

When the total lever 162 is in the "add" position the stud 265 projects into the upper portion of a slot 735 (Figs. 15 and 41) in the right side frame 55. When the lever 162 is moved to its "non-add" position the stud 265 is moved in front of a lug 736 in the slot 735, thereby preventing movement of the stud 265 and link 264. Thus, the link and stud will be held in alinement during "non-add" operations.

A means is provided for latching the total lever in the "non-add" position during the operation of the machine. This means includes the latch 760 (Figs. 5 and 39), loosely mounted on the rod 53, normally held in engagement with a stud 761 secured to an arm 762 secured to the shaft 160. A spring 763 holds the latch 760 in its normal position. When the total lever 162 is moved down to its "non-add" position, the latch 760 is cammed rearwardly against the tension of a spring 763, by flange 764 on the total lever, until the flange passes the hook of the latch 760, whereupon the spring 763 rocks the latch 760 to engage the flange 764, thereby holding the lever 162 in the "non-add" position.

It will be remembered that the shaft 160 is rocked in clockwise direction near the end of the operation of the machine for releasing all of the depressed keys. When the shaft 160 is rocked, the stud 761 withdraws the latch 760 from the flange 764, thereby permitting the total lever 162 to return to its "add" position. A shoulder 765 on a plate 766 acts as a stop for the total lever, when it is released and returned to the "add" position in a manner to be presently described.

The total lever is returned to its 'add" position by a spring 767 (Fig. 39), which normally slides a flanged bar 768 upward. The bar 768 is provided with a flange 769 contacting the under side of the lever 162, and therefore, when the latch 760 releases the lever 162, the spring 767, returns the lever to its "add" position in which the lever 162 is stopped by the shoulder 765.

Another latch is provided which is not operated by the arm 762, and may be used for latching the total lever in its "non-add" position for any number of operations. This latch is mounted on the rod 53 and is provided with a finger piece 770 (Fig. 39), which projects through the cabinet of the machine (see also Fig. 1). After the total lever has been moved to its "non-add" position, the operator may grasp the finger piece 770, and rock the latch 771 to move over the flange 764 on the total lever. A clip 772 (Fig. 40), and a spacing collar are provided for holding the latch 760 in position. A spring washer 773 bears against the clip 772 and against the side of the latch 771, thereby causing the hub 774 of the latch 771 to bear against the right side frame 55 of the machine. This will cause sufficient friction to maintain the latch 771 in the position to which it is adjusted.

A stud 775 on the latch 771 projects through a slot 776 in the right side frame 55, thereby providing a stop for the latch 771 when moving it in either direction.

As before described, the tripped transfer carrying pawls are restored during the beginning of the next operation of the machine. When a totalizer is engaged with the actuators, the stud 298 (Fig. 2) engages the upwardly extending finger 310 of the arm 291, thereby causing the trip pawls to be moved back of the shoulder of the pawl 300. During the "non-add" operations just described, the totalizer does not engage the actuators, and therefore, the stud 298 is never rocked into engagement with the finger 310. For this reason, some means must be provided for preventing the carrying pawls 290, which were tripped during the previous adding operation, from being moved forwardly to effect a transfer when the rod 304 moves forwardly. To prevent this transferring, a spring-actuated pawl 777 (Figs. 3 and 11) has been provided, having a shoulder 778 which moves into contact with the flattened side of the rod 304 when the rod is moved counter-clockwise. A spring is provided for causing the arm 777 to rock upwardly, after the rod 304 passes beyond the shoulder 778. During adding operations, one of the arms 275, having a surface 779, engages the rear end of the pawl 777, thereby withdrawing shoulder 778 from the flattened side of the rod 304, thus permitting the transfers to be effected. However, during "non-add" operations the arm 275 does not move upwardly, and therefore, the surface 779 will not engage the pawl 777, and for this reason the rod 304 will not move forwardly during "non-add" operations. Thus, the transfer pawls which were tripped during the last adding operations will be prevented from carrying during "non-add" operations.

*Total lever interlocks*

When the total lever is moved to the "read" or "reset" position, all of the keys except those in the transaction bank are locked against operation. Movement of the total lever 162 (Figs. 12 and 14) rocks the arm 746, by the stud 745, in counter-clockwise direction, thereby moving the flange 536, beneath the pawl 537 on the flexible detent 57. In this manner, all of the keys will be locked against depression during total taking operations.

Movement of the total lever to either the "read" or "reset" position will also lock out the repeat release key. The total lever is provided with a cam surface 780 (Fig. 5), which engages a stud 781 on the arm 514 when the total lever is moved to the "read" or "reset" position. This movement of the arm 514 rocks the shaft 513 in clockwise direction (see also Fig. 14). Rocking of the shaft 513 also rocks the arm 512 (Figs. 9 and 14) in a clockwise direction, thereby positioning the locking surface 522 (Fig. 14) beneath the stud 510 on the repeat release key to prevent depression thereof.

The total lever 162 must be adjusted in one of its four positions before the machine can be released. The arm 161 (Figs. 5 and 14) is provided with a stud 785 which is rocked into the path of a block 786 when the machine is released with the total lever in the "non-add" position. When the machine is released with total lever in the "add" position, the stud 785 is moved into a notch 787 in the block 786. When the machine is released with the total lever in the "read" position, the stud is moved into a notch 788 in the block 786. When the machine is released with the total lever in the "reset" position, the stud 785 moves beneath the block 786. If the total lever is in one of its intermediate positions, that is, between the "non-add" and "add"; the "add" and "read"; or "read" and "reset" positions, then when the motor bar 76 is depressed, the stud 785 contacts the surface of the block 786, thereby preventing the yoke 157 from being rocked, and in this manner preventing the movement of the link 110 and the release of the machine.

Figure 40:
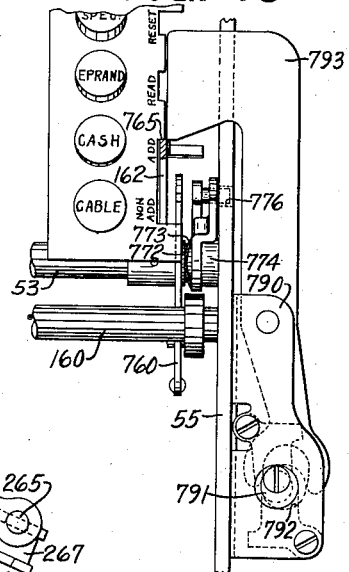
Fig. 40 is a detail view of the total control lever lock.

A lock has been provided for locking the total lever in either the "read" or "reset" position. However, the lever 162 can be moved from the "add" to the "non-add" position, or vice versa, without unlocking the lever. As shown in Fig. 40, the total lever 162 is shown locked in the "add" and "non-add" positions. Mounted in a bracket 790 is the key lock 791, provided with a barrel having an eccentric 792 which projects into a bifurcated lever 793 pivoted to the bracket 790. The arm 793 is moved into the path of the lever 162, thus locking it against movement.

The total lever can be moved to any of its positions when the lever 793 is moved out of its locking position, but after the lever 793 is moved to its locking position, the lever will be locked where set.

If, after a "reset" operation, it is desired to reenter the total on the totalizer, this may be done by the repeat mechanism in identically the same manner as for repeating an adding operation. At the end of the total taking operation, the amount taken from the totalizer is standing on the indicators and the type carriers, and therefore, in order to re-enter this amount, all that is necessary is to press the repeat release key. During this operation the segments 421 (Fig. 3) will control the differential positioning of the actuators 216 in the same manner as during adding repeat operations.

*Transfer totals*

The totals can be transferred from one totalizer to the other any time after a total-taking operation is completed. No preliminary setting is necessary; thus the totals can be transferred even though the operator does not know at the time of making the total-taking operation that the total is to be transferred.

The transferring of a total is effected by the repeat release key 164. If, for example, a total is to be transferred from "A" totalizer to "B" totalizer, all the operator need do is to make a total-taking operation from the "A's" totalizer, either "read" or "reset", and then position the selecting lever 319 to select "B's" totalizer, and depress the repeat release key.

During the total-taking operation, the segments 421 are adjusted to represent the amounts standing on the totalizer. Upon subsequent depression of the repeat release key, the actuators 216 are controlled in the same manner as described for a repeat operation, and therefore, it can be seen that the amount taken from the totalizer will be added into the subsequently selected totalizer.

The transfer total mechanism is not limited to a machine in which there are only two totalizers, inasmuch as this mechanism will function to transfer totals to any number of totalizers.

For example, if the machine was provided with ten totalizers, the total could be taken from any one of the totalizers and transferred to any one or all of the remaining nine totalizers. This is possible because at the end of the transfer total operation, the segments 421 will be standing with the amounts thereon, so all that is necessary to transfer the total to any other totalizer is to select the desired one and depress the repeat release key 154.

Operation

A brief description of the operation and use of the machine will now be given.

The machine is located in the office of the telegraph company, and when a message is presented for transmission the operator depresses the proper amount keys, and if necessary, one of the special transaction keys. However, it is not necessary for the operation of the machine to depress a transaction key. After the amount has been set up on the keyboard, the clerk depresses the motor bar 76, which releases the machine for operation. If the machine is motor driven, the motor will be automatically released by depression of the motor bar 76. However, if it is a manually operated machine, the operator must turn the crank 75 twice after the motor bar 76 has been depressed.

If the next message is a duplicate, all that is necessary for the clerk to do is to depress the repeat release key, whereupon the machine will be released for operation and the machine will print a duplicate record of the transaction and enter the same amount on the totalizer as in the previous operation. In order to perform this repeat operation all that is necessary is to glance at the indicator to determine that the proper amount was previously entered, and depress the repeat release key. It is not necessary that the operator know at the time the original entry is made that the next operation is to be a repeat operation.

Two totalizers are provided, either of which can be selected for entry of amounts, by the totalizer selecting lever 319. A lock is provided for locking the totalizer selecting lever out of either of the selecting positions, or in a neutral position, in which neither of the totalizers can be selected, and the machine cannot be released for operation.

The totals standing on the totalizers can be "read" without disturbing the setting on the totalizer or the total can be printed and the totalizer reset to zero. This is controlled by the total lever 163, which has four positions of adjustment, one "non-add," one "add," one "read" and one "reset." A lock is provided so that the total lever can be locked in any one of these four positions. The movement of the total lever out of its adding position to one of its totaling positions will control the engagement and disengagement of the totalizer with the actuator so that the totalizer will be engaged at the proper time. During this totaling operation, none of the keys can be depressed, and the zero stop pawls for the amount banks are not rocked to their ineffective positions by the keys as during the entry of items. For this reason mechanism is provided to rock the zero stop pawls in the amount banks out of their effective positions to permit the actuators to be controlled by the totalizer pinions. This mechanism is operated by the total lever when it is moved out of its adding position to any one of its total taking positions.

The total can be taken from either totalizer and transferred to the other. This operation consists of taking an ordinary total operation, and thereafter, depressing the repeat release key. However, before the repeat release key is depressed the totalizer to which the total is to be transferred must be selected. This mechanism is also useful when the operator makes a reset operation by mistake, he can re-enter the same amount on the totalizer by subsequently depressing the repeat release key.

While the forms of mechanisms herein shown and described are admirably adapted to fulfill the objects primarily stated, it is to be understood that it is not intended to confine the invention to the forms or embodiments herein disclosed, for it is susceptible of embodiment in various forms all coming within the scope of the claims which follow.

What is claimed is:—

1. In a machine of the class described, the combination of a plurality of totalizers, a corresponding number of record receptacles, a printing mechanism associated with each receptacle, and a manipulative device adapted to simultaneously select one of said totalizers, its corresponding record receptacle, and the printing mechanism associated with the selected record receptacle.

2. In a machine of the class described, the combination of a plurality of totalizers, a lever for selecting one of the totalizers, means to accumulate amounts into the selected totalizer, a plurality of printing hammers each hammer being associated with a totalizer, and means operated by the lever when selecting a totalizer, for engaging the hammer not appropriate to the selected totalizer for preventing operation of said hammer.

3. In a machine of the class described, the combination of a plurality of totalizers, a lever for selecting one of the totalizers, means to accumulate amounts into the selected totalizers, a plurality of printing hammers, a projection on each hammer, and a flanged member operated by the lever for engaging the hammer not appropriate to the selected totalizer for preventing operation of said hammer.

4. In a machine of the class described, the combination of two totalizers, two record material receptacles, each associated with one of the totalizers, means for opening and closing said receptacles, and a manipulative device for selecting one of the totalizers and simultaneously closing the receptacle not associated with the selected totalizer.

5. In a machine of the class described, the combination of a plurality of totalizers, a plurality of record material receptacles, a manipulative device movable to any one of a plurality of positions before the operation of the machine, means operated by the manipulative device for selecting a totalizer, and means also operated by said manipulative device before the operation of the machine for closing the receptacle not appropriate to the selected totalizer.

6. In a machine of the class described, the combination of a plurality of totalizers, a plurality of record material receptacles, means for closing and opening said receptacles, a manipulative device, a rack and pinion means operated by the manipulative device before the machine is operated for selecting a totalizer, and a cam operated mechanism adjusted by the manipulative device for closing the record material receptacle not appropriate to the selected totalizer before the machine is operated.

7. In a machine of the class described, the combination of a plurality of totalizers, a plurality of record material receptacles, means for opening and closing said receptacles, a manually operable lever for selecting one of the totalizers before the machine is operated, and a cam operated by the lever for operating said opening and closing means for closing the receptacle not appropriate to the selected totalizer before the machine is operated.

8. In a machine of the class described, the combination of a plurality of totalizers, a plurality of record material receptacles, each receptacle being appropriate to one totalizer, a lever adapted to select any one of the totalizers, a cam secured to the lever, and a flanged member adapted to be moved into the receptacles for permitting insertion of record material into the receptacle appropriate to the selected totalizer and preventing insertion of record material into the receptacle not appropriate to the selected totalizer.

9. In a machine of the class described, the combination of a plurality of totalizers, a plurality of printing hammers, a plurality of record material receptacles, and means for selecting a totalizer, a printing hammer and a receptacle, said selected printing hammer and receptacle being individual to the selected totalizer.

10. In a machine of the class described, the combination of a plurality of totalizers, a plurality of printing hammers, a plurality of record material receptacles equal in number to the number of hammers, means for opening and closing said receptacles, a lever for selecting a totalizer, and connections from the lever for simultaneously opening a receptacle appropriate to the selected totalizer for the insertion of record material, and for controlling the operation of the printing hammer appropriate to the opened receptacle.

11. In a machine of the class described, the combination of a plurality of totalizers, a plurality of printing hammers, a plurality of record material receptacles equal in number to the printing hammers, a lever for selecting a totalizer, a cam secured to the lever, a pivoted member operated by the cam, a flange on said pivoted member for controlling the operation of a hammer appropriate to the selected totalizer, and a device operated by said pivoted member, adapted to be positioned for the insertion of paper into the receptacle appropriate to the selected hammer.

12. In a machine of the class described, the combination of a plurality of consecutive numbering devices, a plurality of printing means, a lever, a cam secured to said lever, a member operated by said cam, control plates operated by said member for selecting one of said devices for operation, said member adapted to simultaneously select a printing means for printing the consecutive number from the selected device, and means for operating the selected device.

13. In a machine of the class described, the combination of totalizers, a printing receptacle appropriate to each totalizer, means for closing either receptacle and simultaneously for operating said means to open the other, and manipulative means for selecting either of said totalizers and opening the appropriate receptacle.

14. In a machine of the class described, the combination of a plurality of totalizers; a plurality of printing hammers, each appropriate to one totalizer; a plurality of record material strips, each appropriate to one of the printing hammers; a plurality of record material feeding pawls; flanged devices, one associated with each of the feeding pawls, to control the effectivity thereof; a totalizer selecting lever; a cam connected thereto; a member operated by the cam to select the hammer appropriate to the selected totalizer, for making a record of the data entered into that totalizer; and means connected to and operated by said member, and connected to said flanged devices, to operate the latter to render effective the feeding pawl associated with the totalizer selected.

15. In a machine of the class described, the combination of a plurality of totalizers; means for selecting one of the totalizers; a plurality of printing hammers; common operating means for said hammers; and means operated by the totalizer selecting means for engaging the hammer not appropriate to the selected totalizer, to restrain the operation of said hammer by the common operating means.

16. In a machine of the class described, the combination of a plurality of totalizers; a plurality of printing hammers, each appropriate to one totalizer; a plurality of record material strips, each appropriate to one of the printing hammers; feeding pawls for the record strips; means associated with each pawl to control the effectivity thereof; totalizer selecting means; devices operated thereby to select a totalizer and the printing hammer associated therewith to make a record of the data entered into that totalizer; and means operated by said devices, and connected to said first-mentioned means to operate the same to render effective the feeding pawl appropriate to the selected totalizer and printing hammer.

17. In a machine of the class described, the combination with a plurality of totalizers; of means to select any of the totalizers for operation; type lines associated with the respective totalizers; printing hammers corresponding with the type lines to cooperate therewith in printing amounts on record material individual to the several type lines; and means operated by the selecting lever to prevent operation of the printing hammer associated with the totalizer not selected for operation.

18. In a machine of the class described, the combination with a plurality of totalizers; of means to select any of the totalizers for operation; type lines associated with the respective totalizers; printing hammers corresponding with the type lines to cooperate therewith in printing amounts on record material individual to the several type lines; and means operated by the selecting lever to free that printing hammer for operation which is associated with the selected totalizer, and for preventing operation of the remaining printing hammers.

19. In a machine of the class described, the combination with a plurality of totalizers; and actuators common thereto; of a record material receptacle appropriate to each totalizer; a manipulative device adjustable to a plurality of positions to select one or another of the totalizers, and to select the receptacle appropriate to the selected totalizer.

20. In a machine of the class described, the combination of a plurality of totalizers; means for selecting any one of the totalizers for operation; printing means; impression means; means for retaining the impression means in an ineffective position; and means operated by the totalizer selecting means for rendering the impression retaining means ineffective upon selection of a certain totalizer.

21. In a machine of the class described, the combination of a plurality of totalizers; means for selecting any one of the totalizers for operation; printing elements; impression means; means for retaining the impression means in an ineffective position; a lever carrying said retaining means; a connection intermediate the lever and totalizer selecting means and operable by the latter to render the retaining means ineffective upon the selection of a certain one of the totalizers.

22. In a machine of the class described, the combination of a plurality of totalizers; means for selecting any one of the totalizers for operation; printing elements; impression means; means for retaining the impression means in an ineffective position; a lever carrying said retaining means; and a cam device operated by the totalizer selecting means for moving the lever to render the retaining device ineffective when a certain one of the totalizers is selected.

WILLIAM H. ROBERTSON.

CERTIFICATE OF CORRECTION.

Patent No. 1,924,290.     August 29, 1933.

WILLIAM H. ROBERTSON.

It is hereby certified that error appears in the printed specification of the above numbered patent requiring correction as follows: Page 1, line 32, for "varied" read various; page 7, line 33, for "atrips" read trips; page 8, line 33, for "352" read 353; page 9, line 138, for "154" read 164; page 11, line 33, strike out the word "in"; page 16, line 6, for "154" read 164; page 17, lines 66-67, claim 13, strike out the words "for operating said means to open" and insert the word opening; and in line 69, for "opening" read for operating said means to open; same page, lines 141 and 142, claim 20, strike out the words "and to select the receptacle appropriate to the selected totalizer." and insert the same after "totalizers," in line 139, as a part of claim 19; and that the said Letters Patent should be read with these corrections therein that the same may conform to the record of the case in the Patent Office.

Signed and sealed this 28th day of November, A. D. 1933.

F. M. Hopkins (Seal)     Acting Commissioner of Patents.